United States Patent
Crawford et al.

(10) Patent No.: US 8,451,432 B2
(45) Date of Patent: May 28, 2013

(54) LASER SPOT TRACKING WITH OFF-AXIS ANGLE DETECTION

(75) Inventors: Ian D. Crawford, Longwood, FL (US); Noal Chandler, Apopka, FL (US); John Harwick, Sanford, FL (US); Dwight Wildon, Orlando, FL (US); Charles G. Smith, Sanford, FL (US)

(73) Assignee: Analog-Modules, Inc., Longwood, FL (US)

( * ) Notice: Subject to any disclaimer, the term of this patent is extended or adjusted under 35 U.S.C. 154(b) by 170 days.

(21) Appl. No.: 12/835,719

(22) Filed: Jul. 13, 2010

(65) Prior Publication Data

US 2013/0070239 A1  Mar. 21, 2013

Related U.S. Application Data

(63) Continuation-in-part of application No. 11/423,367, filed on Jun. 9, 2006, now Pat. No. 7,773,202.

(60) Provisional application No. 60/688,962, filed on Jun. 9, 2005.

(51) Int. Cl.
*G01C 3/08* (2006.01)

(52) U.S. Cl.
USPC ......... 356/4.07; 356/4.01; 356/4.1; 356/5.01; 356/5.1

(58) Field of Classification Search
USPC ............. 356/3.01–3.15, 4.01–4.1, 5.01–5.15, 356/6–22, 28, 28.5, 139.01–139.1
See application file for complete search history.

(56) References Cited

U.S. PATENT DOCUMENTS

| | | | |
|---|---|---|---|
| 3,562,537 A * | 2/1971 | Miller, Jr. | 250/208.2 |
| 3,877,157 A | 4/1975 | Ashford et al. | |
| 3,941,483 A | 3/1976 | Ferrin | |
| 4,574,191 A | 3/1986 | Conrad | |
| 4,721,385 A | 1/1988 | Jelalian et al. | |
| 4,792,230 A | 12/1988 | Naganuma et al. | |
| 4,812,035 A | 3/1989 | Freedman et al. | |
| 4,830,486 A | 5/1989 | Goodwin | |
| 4,846,571 A | 7/1989 | Jelalian et al. | |
| 4,856,893 A | 8/1989 | Breen | |
| 5,311,353 A | 5/1994 | Crawford | |
| 5,350,134 A | 9/1994 | Crawford | |

(Continued)

OTHER PUBLICATIONS

SeeSPOT III brochure, FLIR Systems Inc., Wilsonville, OR 97070 USA, 2001 (2pp).

(Continued)

*Primary Examiner* — Luke Ratcliffe
(74) *Attorney, Agent, or Firm* — Gerald E Linden

(57) ABSTRACT

A laser spot tracker comprising a quadrant detector. A portion of a spot of laser light reflected from an object being illuminated (OBI) may be defocused to occupy a significant portion such as one-third of the field of view, while another portion remains focused, therefore allowing for quick calculation of the spot centroid. With such a "composite spot", multiple target (OBI) positions may simultaneously be defined in elevation and azimuth with respect to null by analyzing the energy in each quadrant. The X and Y angle information (off null) for multiple targets (OBIs), and their codes may be displayed. For a large, defocused spot, two segmented multi-element detectors may be used, one in front of and the other behind the focal plane to reduce the effects of hot spots in a spot of laser light collected from an object being illuminated.

19 Claims, 11 Drawing Sheets

U.S. PATENT DOCUMENTS

| | | | |
|---|---|---|---|
| 5,651,600 A * | 7/1997 | Dorsey-Palmateer | 353/122 |
| 5,685,504 A * | 11/1997 | Schneider et al. | 244/3.11 |
| 5,973,309 A * | 10/1999 | Livingston | 250/203.1 |
| 6,097,481 A | 8/2000 | Coffey | |
| 6,111,241 A * | 8/2000 | English et al. | 250/203.2 |
| 6,646,479 B1 | 11/2003 | Crawford | |
| 6,650,404 B1 | 11/2003 | Crawford | |
| 7,659,494 B2 | 2/2010 | Lindgren | |
| 2001/0012104 A1 | 8/2001 | Dunne | |
| 2002/0036765 A1 | 3/2002 | McCaffrey et al. | |
| 2004/0061041 A1 | 4/2004 | Ben-Ari et al. | |
| 2005/0275830 A1 | 12/2005 | Ohtomo et al. | |

OTHER PUBLICATIONS

Joint Pub 3-09.1, Joint Tactics, Techniques, and Procedures for Laser Designation Operations, May 28, 1999 (149pp).

Model 741DP Quadrant Tracking Detector/Processor, Analog Modules Inc., Longwood, FL, USA, Aug. 2005 (2pp).

Circle Segment Equations Formulas Calculator, AJ Design Software, (3pp).

AD534, Internally Trimmed Precision IC Multiplier, Analog Modules Inc., Longwood, FL, USA, 1999 (12pp).

Model 742DP Quadrant Tracking Detector/Processor, Analog Modules Inc., Longwood, FL, USA, Jul. 2009 (2pp).

* cited by examiner

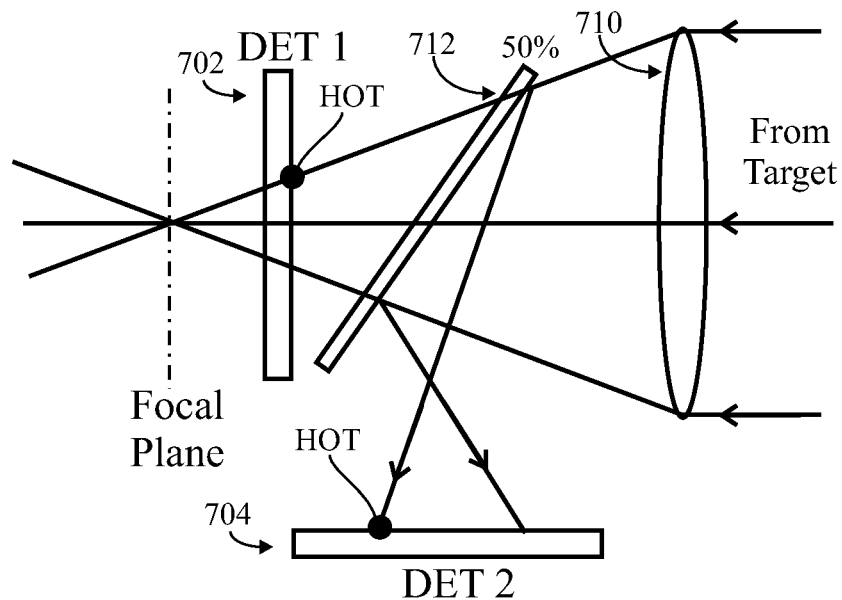
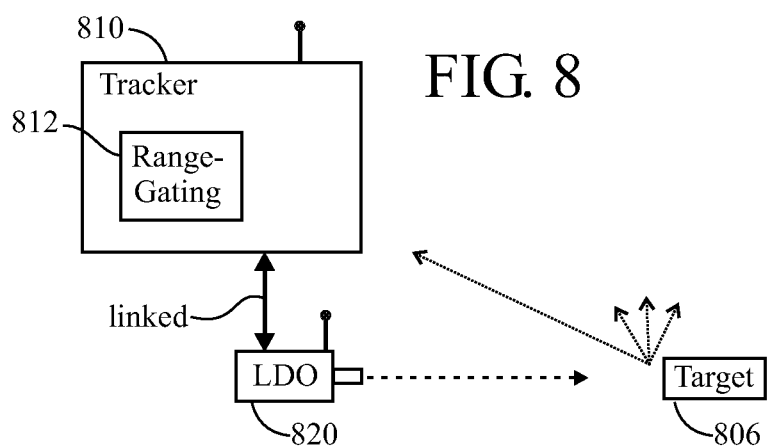

FIG. 9
Co-Ordinates Output   X to X' = 1
| Code | X | Y |
|------|------|------|
| ABC | 0.70 | 0.80 |
| DEF | 0.60 | 0.60 |
| XYZ | 0.35 | 0.35 |
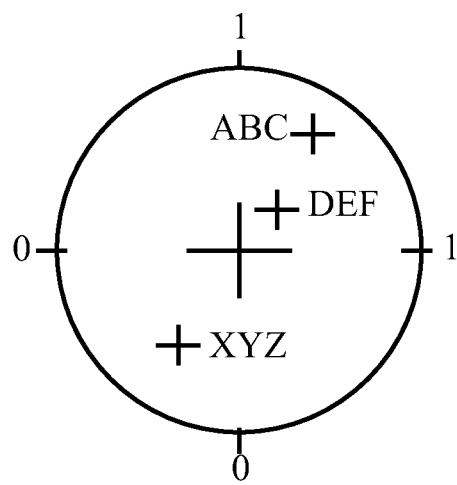
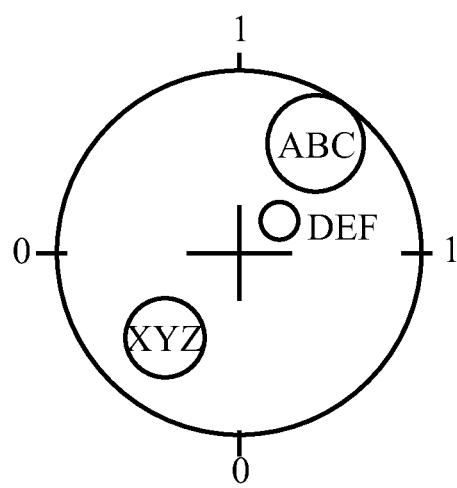

LASER SPOT TRACKING WITH OFF-AXIS ANGLE DETECTION

CROSS-REFERENCE TO RELATED APPLICATIONS

This is a continuation-in-part of Ser. No. 11/423,367 filed Jun. 9, 2006, which is a non-provisional filing of provisional 60/688,962 filed Jun. 9, 2005.

TECHNICAL FIELD

The invention relates generally to laser-guided weapon (LGW) systems and, more particularly, to optical receivers for LGW systems.

BACKGROUND

Laser-guided munitions (generally referred to as laser-guided bombs (LGBs), laser guided weapon systems (such as in an aircraft), or laser-guided weapons (LGWs) use a laser designator to mark (illuminate, "paint") a target. The reflected laser light ("sparkle") from the target is then detected by the seeker head of the weapon, which sends signals to the weapon's control surfaces (fins) to guide it toward the designated point. The illuminating laser light is encoded, and the laser receiver in the LGW is set to react only to reflected laser light having the proper code.

An extensive discussion of laser designation techniques and procedures may be found in *Joint Pub* 3-09.1, *Joint Tactics, Techniques, and Procedures for Laser Designation Operations,* 28 May 1999, incorporated in its entirety by reference herein.

The earliest laser guidance seekers measured the intensity of the reflected laser light at four corners of the seeker window. (Normally, seekers use angle of incidence and when on axis, the focused spot hits the quadrant center; off axis, the spot moves to one quadrant.) The seeker then actuated the weapon's control fins to steer the weapon in the direction of the strongest signal return, thereby keeping the weapon centered on the laser sparkle. Later weapons have more sensitive seekers and more sophisticated control systems that waste less energy with course corrections, improving accuracy and range, but the principle remains essentially the same.

While LGWs are highly accurate under ideal conditions, they present a number of challenges to be used successfully, making them somewhat less than the "silver bullet" sometimes suggested. The first problem is designation. To insure accurate guidance, the target must ideally be illuminated for several seconds before launch, allowing the weapon's seeker to obtain a positive lock, and the target must remain illuminated during much of the weapon's transit time. If the designator's "sparkle" is turned off, blocked, or moved, the weapon's accuracy will be greatly reduced. Laser designation is also very vulnerable to weather conditions. Cloud cover, rain, and smoke frequently make reliable designation impossible. One patent describing a technique for attempting to validate the target is U.S. Pat. No. 5,350,134.

In the 1970s and 1980s it was common for aircraft to depend on a separate designator, either carried by ground forces, operated by the forward air controller, or carried by another aircraft in the strike group. It was often deemed more practical for one aircraft to provide lasing (perform designating) for its comrades. Modern conflicts and a growing emphasis on precision-guided weapons have pointed to the need for autonomous designation, and many fighter-bomber aircraft are now being fitted with designator pods to self-designate for laser-guided munitions.

One problem with LGWs is that there may be false returns from other than the desired target, such as from a nearby sand dune or vehicle. And, in some cases, mistakes are made and the wrong target can be attacked with potentially severe consequences.

It is known to have a spotter confirm that the correct target has been designated. SeeSPOT III, made by FLIR Systems Inc. (Wilsonville, Oreg. 97070 USA), is a hand held thermal and laser spot imager which uses reflected thermal energy from the laser to display like a video camera and display. It has very short range and because it essentially collects and integrates the light from the scene, it cannot decode the pulse timing. The laser spot is essentially seen as part of the scene and the spot has to compete with the background for visibility.

FIG. 1 illustrates an exemplary procedure for aircraft with laser-guided weapons (LGWs) and laser spot trackers, as set forth in *Joint Pub* 3-09.1, *Joint Tactics, Techniques, and Procedures for Laser Designation Operations,* 28 May 1999, incorporated in its entirety by reference herein, at page B-B-2.

In this scenario 100, an aircraft 102 is equipped with a LGW 104 which is shown already in its ballistic trajectory towards a target 106. Also illustrated is a forward air controller (FAC) 108, and a laser designator operator (LDO) 110. The FAC 108 is in radio communication with the pilot of the aircraft 102 and with the LDO 110. The LDO 110 illuminates the target 106 with a laser, and laser light is reflected back, typically as scattered reflections called "sparkle".

Generally, the sequence of events is that the maneuver unit commander (not shown) decides to request close air support. The FAC coordinates laser code, laser target line and frequency and/or call sign of the LDO. The airstrike request includes laser-related data. An airstrike approval message is received, the FAC coordinates marking and air defense suppression. The aircraft is dispatched to a contact point to check in with FAC. The FAC coordinates laser code, laser-target line and frequency and/or call sign with LDO and pilot. Approaching the target, the aircraft calls in. The FAC relays laser control calls. The LDO designates the target (by illuminating it with laser beam). The aircraft acquires the target or releases the LGW. The LGW heads towards the target, adjusting its trajectory based on sparkle from the laser-illuminated target. The target is destroyed.

The situation, as described above, may vary, depending on the type of LGW used. Generally, LGWs home in on reflected laser energy to strike a target. Some LGWs require laser target illumination before launch or release and/or during the entire time of flight; some require illumination only during the terminal portion of flight. For example, designation delay can be used in HELLFIRE engagement when the missile is fired in a lock-on after launch (LOAL) mode. By delaying lasing (illumination of the target), the enemy has less time to react if they have laser warning receivers. In all LGW engagements, two-way communications greatly increase the chances of a successful engagement.

Laser designators can provide precision target marking for employment of air-to-surface and surface-to-surface LGWs. Precise target marking with laser designators is directly related to target size and aspect, laser-beam divergence, designation range, and atmospheric attenuation of the beam. Preferably, aircrews must always acquire targets visually. However, ground LDOs normally have more powerful optics to acquire targets, more time, and lower task loading than do aircrews of fighter or attack aircraft. The LDO may be either on the ground or airborne.

Laser illumination of a target requires an unobstructed line-of-of sight path between the laser designator and the target. In some cases, redundant laser designation is employed. This is a technique employing two or more laser designators in different locations but on the same code to designate a single target for a single LGW. For example, in the case of moving targets (such as a tank), using two designators may preclude a guidance failure as a result of temporary (line of sight) blockage (such as from intervening structures).

After illumination of the target, the aircrew must maneuver the aircraft to acquire the laser designator's energy using a laser spot tracker (LST). A visible mark may also be necessary to help the aircrew align the seeker.

Laser Codes

The aforementioned *Joint Pub* 3-09.1, *Joint Tactics, Techniques, and Procedures for Laser Designation Operations*, 28 May 1999, Chapter IV, incorporated in its entirety by reference herein, describes the laser codes. The following is extracted/edited therefrom.

Laser designators and seekers use a pulse coding system to ensure that a specific seeker and designator combination work in harmony. By setting the same code in both the designator and the seeker, the seeker will track only the energy with the correct coding. The seeker will track the first correctly coded, significant laser energy it sees. The seeker will always lock on to the most powerful return in its view. The pulse coding used by all systems discussed in this manual is based on pulse repetition frequency (PRF). (Laser codes are normally simple PRFs in the 10 to 20 Hertz range.)

The designator and seeker pulse codes use a modified octal system that uses the numerical digits "1" through "8." The codes are directly correlated to a specific PRF (pulse repetition frequency), but the code itself is not the PRF and therefore can be communicated in the clear as required. Depending on the laser equipment, either a three- or four-digit code can be set. Three-digit code equipment settings range from 111 to 788. Four-digit code equipment settings range from 1111 to 1788. The three- and four-digit code equipment is compatible, and any mix of equipment can be used in all types of laser operations. However, when using a mix of three- and four-digit code equipment, all personnel must understand that the first digit of a four-digit code is always set to numerical digit "1". The remaining three digits will be set to match the three digits of the three-digit code equipment. As an example, a three-digit code of 657 would be set to 1657 on a four-digit code system or vice versa.

The lower the code number, the faster the laser pulse rate. The lower code number and faster pulse rate will give the seeker the most opportunity to acquire the target in the time available, and is appropriate for the most important targets and the most difficult operating conditions. However, lower code numbers cause faster battery drain.

Coding allows simultaneous or nearly simultaneous attacks on multiple targets by a single aircraft, or flights of aircraft, employing LGWs set on different codes. This tactic may be employed when several high-priority targets need to be attacked expeditiously and can be designated simultaneously by the supported unit(s).

Certain codes (low code, high PRF, and/or faster pulse rate) are preferred for laser systems requiring precision guidance. Codes must be prebriefed to both the FAC and aircrews for situations where communications cannot be established or authorized.

Laser coding can be used effectively and securely with LGBs (LGWs). LGB codes are set on the bombs before takeoff and cannot be changed in the air. The aircrew is told the code, but advance coding information might not be sent to the supported ground unit. When the aircraft is on-station, the aircrew passes the code to the FAC. When the use of an LDO is required, the FAC coordinates with the LDO to ensure that the laser designator is set on the same code as the LGBs.

Laser Spot Trackers

A laser spot tracker is a sensor that picks up coded laser energy from a laser designator and projects a symbol on a sight or heads up display. Angle information may also be given to a weapons system. This symbol allows an operator to visually acquire the target designated by his or a friendly (LDO) laser. Most laser spot trackers are mounted on helicopters or fixed wing aircraft. It is believed that, at this time, there are no known ground-based systems with laser spot trackers, and it is believed that the only fixed wing aircraft with both a laser designator and a laser spot tracker are Navy F-18s and USAF fighters equipped with the Lightning II targeting pod, and European planes, Jaguar, Harrier and MRCA using the LRMTS (Laser Ranger and Marked Target Seeker) system. While the OH-58D, SH-60B, and HH-60H do not have laser spot trackers, pilots can see a laser spot if they are carrying a Hellfire Missile due to the missile seeker head cuing in their weapons display.

Some Patents of Interest

U.S. Pat. No. 5,350,134, incorporated in its entirety by reference herein, discloses target identification systems. A target identification system includes a target marker for selecting, and directing radiation at, a target, a weapon delivery system, and means for establishing a two-way communication channel between the two by reflection from a selected target. The communication is by infra-red laser and coded information is sent between the target marker and the weapon delivery system to identify the selected target.

U.S. Pat. No. 5,311,353, incorporated in its entirety by reference herein, discloses wide dynamic range optical receivers. A wide-dynamic range optical receiver amplifier is provided by using two separate amplifiers. The first amplifier is a low-impedance input, low-noise, high-gain amplifier, preferably a transresistance amplifier. An input resistor is chosen for the amplifier such that its resistance value is much greater than the input impedance of the first amplifier, resulting in insignificant change in input impedance when the first amplifier's output becomes saturated. A light-induced signal source is connected to the input resistor such that signal current from the light-induced signal source flows through the input resistor into the first amplifier input. A second high-input-impedance amplifier (preferably an FET-input buffer amp) is connected to receive the light induced signal source, either directly or through a resistive divider network. The difference in gain between the two amplifiers serves to extend the dynamic range of the optical receiver amplifier without switching input or feedback components, and without discontinuous response as the first amplifier becomes saturated. Other embodiments are directed to a further diode induced breakpoint, and to a front-end for a spot tracking system. As further disclosed therein, Optical receivers (or opto-receivers) measure light used in various applications such as atmospheric studies, laser rangefinding, and spot tracking. In many applications it is desirable to utilize the value of light flux over a wide dynamic range. For example, a target-tracking (spot-tracking) device may provide directional information to a target by means of splitting a focused light spot reflected off of a target between four quadrants of a multi-sector photodetector. The distribution of light between the four quadrants of the photodetector provides an indication of how far "off-center" the detector is aimed. The light flux varies over a wide dynamic range as the tracker approaches the target, yet measurements must be taken.

FIG. 3a is a block diagram of a front end 300 for a spot tracking system utilizing wide dynamic range optical receivers of the type described hereinabove (e.g., 100, 200). In a spot-tracking system, a bright spot of light, e.g., a laser-generated spot, is focused on a target. Reflected light 305 from the target is imaged by an optical system 310 (e.g., a lens) onto a multi-sector photodetector 312 (described hereinbelow with respect to FIG. 3b). Signals from the multi-sector photodetector 312 are amplified by opto-receiver electronics 314 to provide a number (four shown) of sector (quadrant) output signals 316a, 316b, 316c, and 316d. In a spot tracking system, these signals are used to determine the position of the target relative to the orientation of the photodetector 312, and to provide guidance or steering signals to "aim" the photodetector 312 (or the device upon which it is mounted) more accurately towards the spot on the target.

FIG. 3b is a view of a four-quadrant multi-sector photodiode assembly 312 for use in a spot-tracking system such as that described with respect to FIG. 3a. The photodiode assembly 312 has an array of four distinct photosensitive areas (quadrants or sectors) 320a, 320b, 320c, and 320d. Each sector 320a, 320b, 320c, and 320d, has a first electrical connection 318a, 318b, 318c, and 318d, respectively. Second electrical connections to the each of the photo-sensitive areas are connected in common and provided as a single electrical connection 318e. The sensitive areas 320a, 320b, 320c, and 320d operate independently as separate photodiodes, each responding only to light impinging thereupon. Dashed line 305a indicates the effect of a perfectly centered spot illuminating each of the sensitive areas 320a, 320b, 320c, and 320d, equally.

It will readily be appreciated by one of ordinary skill in the art that although the four-quadrant photodiode assembly 312 shows four diodes connected in a common-cathode configuration, that multi-sector photo-diode assemblies can also be fabricated in a common-anode configuration, as discrete sector diodes, and with any number of sensitive areas. It is within the scope and spirit of the present invention to adapt any such single or multi-sector configuration of photodiodes for use with opto-receivers of the type described hereinabove with respect to FIGS. 1 and 2.

FIG. 3c is a schematic representation of the four quadrant photodiode 312 of FIG. 3b, wherein the four sensitive areas 320a, 320b, 320c, and 320d are represented graphically as four separate photodiodes with a common connection (318e).

FIG. 3d is a block diagram of a four-quadrant optical receiver system for use with a spot tracking system, according to the invention. (This figure corresponds roughly to the combination of 312 and 314 as described with respect to FIG. 3a.) In the figure, a four quadrant photodiode assembly is connected such that one sensitive area 320a, 320b, 320c, and 320d is connected to each of four opto-receivers 314a, 314b, 314c, and 314d, respectively. These opto-receivers 314a, 314b, 314c, and 314d are built according to the present inventive technique (e.g., 100—FIG. 1, or 200—FIG. 2).

While FIGS. 3a-d describe a "front-end" for a spot tracking system using a four-quadrant photodetector (the four quadrant photodiode 312), it will be readily appreciated by one of ordinary skill in the art that similar spot tracking systems are possible utilizing multi-sector detectors with two or more sensitive areas and a like number of opto-receiver amplifiers of the type described hereinabove. Where only linear tracking (one dimensional, e.g., up-down or left-right) is required, a "two-channel" system may be constructed using a two-sector photodetector and two opto-receiver amplifiers (e.g., 100—FIG. 1 or 200—FIG. 2). A two dimensional (i.e., "X" and "Y") spot tracking system can be constructed using a multi-sector photo-detector having three or more non-collinear sensitive areas and a like number of opto-receiver amplifiers.

It will also be readily appreciated by one of ordinary skill in the art that the photoconductive detectors described hereinabove (e.g., 101, 201, 312) may be provided by photodiodes (e.g. PIN diodes), phototransistors, or any other suitable photodetector device and that with an appropriate reversal of polarities, the principles of the present invention may be readily applied to negatively referenced or ground-referenced photodetectors. Accordingly, it should be recognized that the circuits described hereinabove are merely exemplary of physical configurations of this type and should not be considered as limiting the scope of the invention.

As further disclosed therein, the following patents generally disclose detecting and/or measuring light, especially laser light: U.S. Pat. Nos. 4,792,230 (measuring ultra-short optical pulses); 4,721,385 (FM-CW laser radar system); 4,830,486 (frequency modulated laser radar); 4,856,893 (which discloses both CW and pulse lasers, as well as range measurement); 4,812,035 and 4,846,571 (AM-FM laser radar).

Commonly-owned U.S. Pat. No. 6,650,404, incorporated in its entirety by reference herein, discloses laser rangefinder receiver. In a laser rangefinder receiver, a return signal from a light-sensitive detector is passed through a high-pass filter, and is then processed in two separate circuit paths, a "signal" path and a "noise" path. The "signal" path employs a time-variable offset scheme to control receiver sensitivity. The "noise" path measures noise in the return signal, and maintain a noise-based threshold independent of the time-variable sensitivity of the "signal" path. No interstage coupling capacitors are employed, which contributes greatly to the receiver's quick saturation recovery. As further disclosed therein, Laser rangefinders are well known, and are used to measure distances to targets. Generally, a laser transmitter is used to beam a high intensity pulse of light onto a selected target. The light scattered from (echoed or reflected off of) the target is detected by an optical receiver (or "opto-receiver") which is normally located in close proximity to the laser transmitter. By measuring the transit time (time-of-flight) between a transmitted laser pulse and the received echo, the range (distance) to the target can be determined using a time-interval counter.

GLOSSARY & DEFINITIONS

Unless otherwise noted, or as may be evident from the context of their usage, any terms, abbreviations, acronyms or scientific symbols and notations used herein are to be given their ordinary meaning in the technical discipline to which the disclosure most nearly pertains. The following terms, abbreviations and acronyms may be used throughout the descriptions presented herein and should generally be given the following meaning unless contradicted or elaborated upon by other descriptions set forth herein. Some of the terms set forth below may be registered trademarks (®).

A-D short for analog-to-digital. An analog-to-digital converter (abbreviated ADC, A/D or A to D) is an electronic circuit that converts continuous signals to discrete digital numbers. The reverse operation is performed by a digital-to-analog converter (DAC).

APD short for avalanche photodiode. An APD is a specialized silicon PIN photodiode with internal gain. APDs are designed to operate with high reverse-bias voltages that cause the electron-hole pairs generated at the P-N junction to gain sufficient energy to create additional pairs, and so forth. This effect is known as avalanche multiplication.

azimuth generally indicating a horizontal (side to side, left or right) direction, such as in what direction a star (or laser-designated target) is located, from a reference point such as straight ahead.

comparator In electronics, a comparator is a device which compares two voltages or currents, and switches its output to indicate which is larger. More generally, the term is also used to refer to a device that compares two items of data.

DC short for direct current. DC is electrical current that flows in one direction, such as from a normal flashlight battery. It's counterpart, AC (alternating current) is current that alternately flows in one direction, than the other direction, such as normal household current.

elevation generally indicating a vertical (up and down) direction, such as how high a star (or laser-designated target) is positioned in the sky from a reference point such as the horizon.

gain In electronics, gain is usually taken as the mean ratio of the signal output of a system to the signal input of the system. A gain of five would imply that either the voltage or power is increased by a factor of five. It has wide application in amplifiers.

laser A LASER (Light Amplification by Stimulated Emission of Radiation) is an optical source that emits photons in a coherent beam. Laser light is typically near-monochromatic, i.e. consisting of a single wavelength or hue (color), and emitted in a narrow beam. This is in contrast to common light sources, such as the incandescent or fluorescent light bulb, which emit incoherent photons in almost all directions, usually over a wide spectrum of wavelengths.

LGW short for laser-guided weapon. Also referred to as laser-guided bomb (LGB). Generally, LGW is any ordinance that homes in on its target by sensing laser light reflected from a designated target. The target is illuminated by a "designator". The weapon typically has a "tracker" to sense the direction from which the laser light is being reflected (nominally, the target). Typically, the LGW is delivered by an aircraft. The designator may be in the same aircraft as the aircraft delivering the weapon, or the designator may be in another aircraft, or the designator may be on the ground. The laser light (beam) is typically modulated with codes to distinguish it from other lasers that may be illuminating other targets. The codes are coordinated between the tracker (weapon, aircraft delivering the weapon) and the designator.

modulation Generally, modulation is the process of varying a signal in order to use that signal to convey information. For example, a laser light beam can be modulated to have a characteristic (code) that is different from other seemingly-similar laser light beams.

photodiode A photodiode is a semiconductor diode that functions as a photodetector. Photodiodes are packaged with either a window or optical fiber connection, in order to let in the light to the sensitive part of the device. They may also be used without a window to detect vacuum UV or X-rays.

PIN short for positive-intrinsic-negative. A PIN photodiode is a silicon photodiode with a high-resistance intrinsic area between the P and N layers, thus the name positive-intrinsic-negative photodiode.

quadrant A quadrant refers to a sector which is one quarter of a circle—like cutting a pie into four pieces.

RMS short for root mean squared. RMS is a mathematical, statistical measure of the magnitude of a varying quantity.

sensitivity The sensitivity of an electronic device, e.g., a communications system receiver, or detection device, e.g., PIN diode, is the minimum magnitude of input signal required to produce a specified output signal having a specified signal-to-noise ratio, or other specified criteria.

wavelength The wavelength is the distance between repeating units of a wave pattern. It is commonly designated by the Greek letter lambda ($\lambda$). In a sine wave, the wavelength is the distance between the midpoints of the wave—like the distance between ripples on a pond when you throw a rock in. Wavelength is related to frequency—the higher the frequency, the shorter the wavelength. Light has a very high frequency and a very short wavelength. Radio waves have a lower frequency than light, and a longer wavelength than light. Sounds have a much lower frequency than radio waves, and a much longer wavelength. The wavelength of light is often measured in microns (um, or millionths of a meter) or angstroms (Å, a ten thousandth of a millionth of a meter).

BRIEF DESCRIPTION (SUMMARY)

The disclosure of the parent application (Ser. No. 11/423,367 filed Jun. 9, 2006) is directed to a laser spot tracker device comprising a laser tracker receiver using a quadrant detector incorporated into a pair of binoculars or optical telescope system with a crosshair or reticle. Directional information from the laser tracker receiver is displayed to allow the reticule to be manually steered on to the target illuminated by the laser, thus identifying the target to the spotter. The laser code may be pre-selected to track a particular designator, or, the tracker may read out the code or codes of laser spots within its field of view.

An operator (JTAC) using the laser spot tracker (referred to herein as "SPOTTR") is able to view the laser designator PRF Code to confirm that the correct designator is illuminating the correct target and "clear hot" ordinance to be dropped. If the correct target is not illuminated the JTAC can give commands to the laser designator operator (LDO) to shift the laser spot to the correct target. Combat capability may thereby be increased by reducing the time for target confirmation and talk-ons, thereby speeding up the targeting process and minimizing targeting errors that can result in fratricide or collateral damage.

According to an embodiment of the invention, a method of verifying that a target is being illuminated by a laser comprises: viewing the target through a composite device comprising an optical portion having a field of view (FOV) for viewing the target in a target area, and a opto-receiver portion for detecting reflected laser light; and generating and displaying information about the received laser light in the field of view, along with an image of the target in the target area.

Generally, the method comprises centering the target in a reticle in a field of view of the optical portion of the composite device and displaying direction of the reflected laser light from the target in the field of view.

The display may include indicia indicating distance and direction of the laser spot from the target. As used herein, "distance" refers to separation in azimuth—namely, whether the spot is "close to" or "far from" the target in the center of the FOV. This is different than distance from SPOTTR to the target, which may be referred to as "range". Generally, the idea of course is that an object being illuminated by the laser is the intended target. But when the object being illuminated (or "OBI") is not the intended target, it is important to determine the offset (or distance in azimuth and elevation) of the OBI from the target so that appropriate corrections (such as in aiming) can be made.

The indicia may be in the form of a set of inner quadrant arcs, and illuminating appropriate ones of the inner arcs when the reflected laser light close to the center of the field of view (FOV), and a set of outer quadrant arcs, and illuminating appropriate ones of the outer arcs when the reflected laser light is far from the center of the field of view (FOV).

The intensity (signal strength) of the reflected laser light may be displayed (using an appropriate indicator).

The code of the laser light may (generally, should be) displayed.

Multiple lasers (designators) may be tracked in the field of view, and means may be provided for toggling through the designators.

In a first mode of operation, only information that matches a given laser code may be output (displayed). In a second mode of operation, information that matches any allowed code description may be output (displayed), and the user can select a code description, after which only information matching the selected code is output.

According to an embodiment of the invention, a method of coordinating delivery of a laser guided weapon (LGW) to a target comprises: illuminating a desired target with laser emitting laser light; observing whether the laser is on-target by combining a visual image of the target with a display of information about the laser light, the information comprising at least direction from target and distance from target; if it is determined that the laser is on target, clearing an aircraft to deliver ordnance to the target; and if it is determined that laser is not on target, re-aiming the laser based on the displayed distance and direction from the target. The display of information about the laser light may comprise laser code and signal strength.

According to an embodiment of the invention, apparatus for viewing a target and determining a direction and distance of a spot of reflected laser light from the target comprises: a visual system comprising viewing optics for viewing a scene which contains the target; an electronic system collecting the reflected laser light with a segmented detector capable of sensing the angle of the spot of incoming laser light; means for generating information pertaining to a distance and direction of the spot from the target; and display means for superimposing the information onto the view of the scene which contains the target. The display means may indicate a direction to move to a null, which is boresighted with a reticle in the viewing optics to superimpose crosshairs onto and therefore identify the far-field target from which the laser radiation is coming.

The apparatus may comprise separate detection of signal compared to noise in each channel, optionally including a sum channel.

The apparatus may comprise means for providing serial or parallel data to output of any or all of: signal level per quadrant; arc position data, code data; gain range; multiple target information and gain data.

The apparatus may comprise an added night sight boresighted with the laser detector null direction.

The apparatus may comprise a laser receiver telescope and detector mounted on a stabilized gimbal.

The apparatus may comprise a collection lens/mirror and detector fixed and a moving optical element between the laser light collection means and the detector means to stabilize the laser sightline from external vibration or short-term movement.

The apparatus may comprise a laser telescope unstabilized, used with either a stabilized or unstabilized optical sight.

The apparatus may be in the form of a binocular, with one visual optical system and one laser receiver optical system.

The apparatus may comprise a laser rangefinder boresighted to the null position in order to get range information to the target.

The apparatus may comprise integrating a laser rangefinder receiver with the segmented detector position sensitive receiver using a common detector for time of flight measurement and directional measurement.

The apparatus may comprise a laser designator boresighted with the null position to allow for hand-off of the designation function after target confirmation.

The apparatus may comprise display of directional and/or other information superimposed or projected onto the visual display so that may be simultaneously viewed.

The SPOTTR device described in the parent application (Ser. No. 11/423,367 filed Jun. 9, 2006) can detect one or multiple coded targets and provide direction to a single (one) chosen target using simple bang-bang electronics.

The tracker disclosed herein may be considered to be, but it is not limited to being an "improvement" to the SPOTTR device of the parent application, and enable features such as:
  measuring angle off null;
  measuring and displaying multiple codes;
  displaying/outputting angles to multiple targets.

Improvements to the SPOTTR device disclosed herein can detect one or multiple coded targets and measure and store amplitude of signals for each code (time shared due to narrow pulses and relatively narrow gates). The co-ordinates of each target may be calculated in the DSP and output to a weapon system or display. One target may be selected and position accuracy enhanced by steering near null (but not necessarily to null as is done by prior art). This allows boresight errors to a co-located designator to be measured and the designator sight corrected for from the azimuth and elevation output of the "improved SPOTTR".

According to an aspect of the invention, the position and codes of multiple targets being tracked may be presented, thereby providing the operator with knowledge of what targets are within the FOV and what codes are being used for each target.

Practical improvements to reduce the effect of dirt or hot spots in the beam homogeneity are disclosed using two detectors located effectively before and after focal plane (FP).

Accuracy improvements at null may be achieved by a dual beam focus to provide a "composite spot" comprising a defocused component (portion) and a focused component.

Generally, existing systems are designed to respond to one code, one target, and null the weapon in order to strike the target. SPOTTR and its improvements disclosed herein are designed to confirm and enhance the accuracy of weapon systems by ensuring the correct target is selected quickly, identify other designators/targets, and confirm the beam aiming of a co-located designator.

The tracker (or "improved SPOTTR") disclosed herein can operate off null for alignment—in other words, where the target(s) are. (In the SPOTTR of the parent application, you had to choose one target and null it.)

According to some improvements disclosed herein, a linear field of view (FOV) may be achieved, as well as cancellation of aberrations using the dual detector approach.

In an embodiment of the invention, a method of locating at least one object being illuminated by a laser designator with a tracker may comprise: providing a tracker having a quadrant detector in a field of view; receiving laser light scattered by the at least object being illuminated; causing the received laser light to impinge as a corresponding at least one spot on the quadrant detector; for each of the spots of received laser light impinging on the detector, determining an angle of the spot of the received laser light relative to a center of the field of view. The method may further comprise increasing a size of the at least one spot at the detector so that a given spot covers approximately one-third of the field of view, and the increased-in-size spots may be used to derive off null positions of objects being illuminated. Multiple targets with different PRF codes may be simultaneously processed. An angle with respect to null for each of the spots of received laser light may be displayed.

Generally, the sizes of the spots are increased to be sufficiently large to impinge on multiple quadrants of the detector. The method may further comprise determining centroids for the spots: and providing outputs representing elevation and azimuth of the centroids of the spots relative to a boresight direction. The outputs may represent elevation and azimuth for each of multiple objects being illuminated, each tagged with a code to allow for identification of their respective designators. Azimuth and elevation angular co-ordinates may be calculated for centroids of the spots by measuring energy of the received laser light in each quadrant of the detector. This may be done by adding signals from the quadrants on each side (or top/bottom) of an axis of interest, and deriving a ratio of these quadrants such that that the ratio varies as the spot traverses the quadrants across the axis of interest.

According to a feature of the invention, the spot size may be increased for a defocused portion of the received laser light, a remaining focused portion of the received laser light impinging as a relatively small spot on the detector.

According to a feature of the invention, the quadrant detector may comprise two quadrant detectors. A first of the two detectors may be disposed in front of the effective focal plane; a second of the two detectors may be disposed behind the effective focal plane; and the outputs of the two detectors may be combined to reduce inconsistencies of amplitude within the spots.

In an embodiment of the invention, a tracking device for determining azimuth and elevation of a spot of laser light collected from an object being illuminated relative to a boresight direction may comprise: a lens for focusing the laser light and having an effective focal plane: a first detector disposed in front of the effective focal plane; a second detector disposed behind the effective focal plane; and the two detectors are connected in parallel with one another, thereby reducing effects of non-homogeneities in a spot of laser light impinging on the two detectors. Each of the detectors may have four quadrants, an upper left quadrant (A), an upper right quadrant (B), a lower right quadrant (C) and a lower left quadrant (D).

The two detectors may be disposed coaxial with one another in the optical path so that a first of the two detectors collects approximately 50% of the received light able to be responded to; and a second of the two detectors collects a substantially equal remainder of the received light able to be responded to. A beam splitter may be used to cause the received light to impinge on both of the two detectors.

In an embodiment of the invention, a method of providing alignment information for a laser designator may comprise: co-locating a tracker with the designator; and comparing and measuring return angles of laser light from a target to a null boresight. Additionally, a code of the laser designator may be tracked.

Apparatus is disclosed for viewing a target and determining a direction and distance of a spot of laser light reflected by the target, comprising:
  an electronic system for collecting the received laser light with a quadrant detector capable of sensing an angle of the spot of received laser light;
  means for generating information pertaining to a distance and direction of the spot of received laser light from null; and
  means for increasing the spot size at the detector to cover approximately one-third of the field of view; and
  a visual or infra-red system, separate from either the target or a source of the laser light, comprising viewing optics for viewing a scene which contains the target;
  and may further comprise: a display for displaying information about azimuth and elevation angles of a centroid of the spot with respect to null.

A method is disclosed of coordinating delivery of a laser guided weapon (LGW) to a target comprising:
  with a laser designator, illuminating a object intended to be the target with laser light, said object reflecting the laser light;
  observing with a device which is separate from any of the designator, the object intended to be the target, and the target whether the designator is illuminating the intended target by combining a visual image of the intended target with a display of information about the received laser light, the information comprising at least a direction and a relative distance of the object being illuminated from the intended target;
  if it is determined that the laser is on target, clearing an aircraft to deliver ordnance to the target; and
  if it is determined that laser is not on target, re-aiming the laser based on the displayed distance and direction from the target;
    wherein the information about the laser light comprises at least one of laser code and signal strength.

The invention is generally directed to a Laser Spot Tracking System to Simultaneously Process Multiple Targets with Position and Code Data. Laser spot trackers have been used for many years to steer a weapon system onto target. Typically a pulsed narrow beam laser illuminates the target the laser light is scattered from the target. The tracker or seeker lens collects the some of the scattered light and condenses it into a spot. The tracker is steered until the spot is divided equally into four equal signals normally using a quad detector, the null position. In this position the tracking head boresight is pointed at the target.

There are two ways used to process the signals. The "bang-bang" method compares opposite quadrants or directions and the spot is dithered around the null position as the comparators make a series of corrections. A typical "bang-bang" system is described in U.S. Pat. No. 6,097,481.

A second more complex method measures the peak amplitudes of the signal in each of the four channels. If the four quadrants are A, B, C and D, then one axis is A+B/C+D and the other axis is A+D/B+C. Dividing by the sum channel, A+B+C+D, may normalize these signals. This approach may give a proportional area to optimize the response of the tracking elevation and azimuth servos. All the systems known to date are given a pulse timing code and track one laser spot with that particular code. Where possible, steps are taken to avoid tracking the wrong spot.

Systems are also available to view the laser spot (such as C-spot Camera, Carl Zeiss Optronics; or SeeSPOT by FLIR), but these do not provide coding information and rely on the operator to find the spot. It is an object of this disclosure to provide a method of knowing both the position and codes used with multiple targets.

In the parent application (SPOTTR), a quadrant detector is used to confirm the code and location of designated targets. The present disclosure is an expansion of that concept to give the position of multiple targets without actually steering the reticule to a null position for each target. The advantage of this type of spot tracker is that it will steer the operator to a correct (coded) unknown designated position at long ranges without the difficulty of identifying a spot from the background.

There can be a benefit to knowing the amount of angular misalignment when using the quadrant detector to measure angles, such as checking a laser designator boresight. There is also a need to simultaneously identify multiple targets that may be off-boresight axis. A system that relies only on a tracking null to measure angle cannot measure boresight errors in the event that a null position is not possible, and cannot steer to null on multiple targets simultaneously.

It is therefore an object of the invention to provide a method to accomplish these tasks—to give an operator a choice of targets and to give an indication of the angular position of the target(s) with respect to the boresight reference.

Other objects, features and advantages of the invention will become apparent in light of the following description(s) thereof.

BRIEF DESCRIPTION OF THE DRAWINGS

The structure, operation, and advantages of the present preferred embodiment of the invention will become further apparent upon consideration of the descriptions set forth herein, taken in conjunction with the accompanying figures (FIGs). The figures (FIGs) are intended to be illustrative, not limiting. Although the invention is generally described in the context of these preferred embodiments, it should be understood that it is not intended to limit the scope of the invention to these particular embodiments.

FIG. 1 is a diagram of a battlefield scenario involving a LGW, according to the prior art.

FIG. 2 is a diagram of a battlefield scenario involving a LGW, according to an embodiment of the invention.

FIG. 3 is a diagram of a view through an optical target tracking receiver, according to an embodiment of the invention.

FIG. 4 is a schematic diagram of an exemplary embodiment of an optical target tracking receiver, according to an embodiment of the invention.

The following FIGS. 4A and 5-9 are newly-presented in this application.

FIG. 4A is a schematic diagram of an exemplary embodiment of an optical target tracking receiver, according to an embodiment of the invention.

FIG. 7C is a diagram showing an alternate embodiment of the invention with two quadrant detectors, one (DET 1) in front of the focal plane, the other (DET 2) behind the focal plane (and including a mirror or beamsplitter).

FIG. 8 is a diagram showing a tracker such as SPOTTR co-located with LDO.

FIG. 9 is a diagram showing some exemplary methodology for some embodiments of the invention.

DETAILED DESCRIPTION

The subject matter of the parent application (Ser. No. 11/423,367 filed Jun. 9, 2006) is generally directed to a device (Stabilized Portable Optical Target Tracking Receiver; referred to herein as "SPOTTR") for spotting reflections from lasers illuminating targets, including decoding and displaying laser codes, and to deploying the device in a battlefield scenario.

Figure 1:
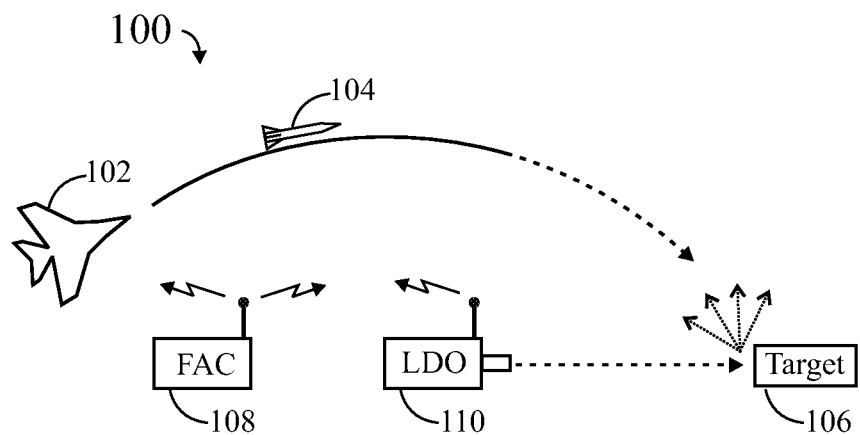
FIGS. 1-4 (not including 4A) were presented in the parent application (Ser. No. 11/423,367).
Figure 2:
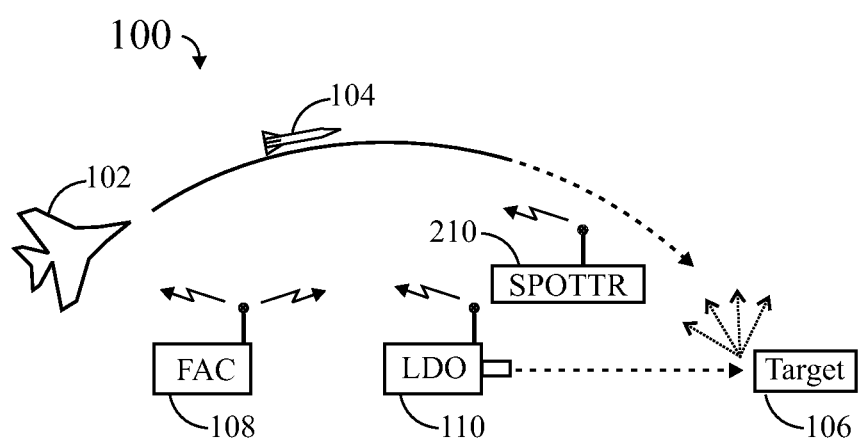

FIG. 2 shows a target tracking receiver 210 deployed in the battlefield scenario 100 of FIG. 1.

The target tracking receiver (SPOTTR) 210 can provide accurate stand-off verification of target illumination by airborne or ground laser designators (110). This object may be achieved by use of a Stabilized Portable Optical Target Tracking Receiver (SPOTTR).

SPOTTR is designed to allow an operator (Joint Terminal Attack Controller (JTAC)) on the ground near the target area, to detect and decode laser energy from an airborne or ground laser designating military targets. SPOTTR greatly increases the assurance that ordinance will be delivered to the intended target, critical when friendly forces are nearby in a close air support environment.

The JTAC (using SPOTTR) is able to view the laser designator PRF Code to confirm that the correct designator is illuminating the correct target and "clear hot" ordinance to be dropped. If the correct target is not illuminated the JTAC can give commands to shift the laser spot to the correct target. Combat capability is increased by reducing the time for target confirmation and talk-ons, thereby speeding up the targeting process and minimizing targeting errors that can result in fratricide or collateral damage.

Generally, SPOTTR comprises a laser tracker receiver using a quadrant detector (such as disclosed in U.S. Pat. No. 5,311,353) incorporated into a pair of binoculars or optical telescope system with a crosshair or reticule. Directional information from the laser tracker receiver is displayed to allow the reticule to be manually steered on to the target illuminated by the laser, thus identifying the target to the spotter. The laser code may be pre-selected to track a particular designator, or, the tracker may read out the code or codes of laser spots within its field of view.

SPOTTR is a "composite" device combining (i) an optical system for viewing a target and (ii) an opto-receiver system detecting reflected laser light. The two systems are integrated together, and a display presents information about the detected laser light to the operator (JTAC), preferably in the same field of view (FOV) as his visual image of the target.

The display image can be combined (superimposed) with the visual image in a conventional manner using beamsplitters or the like to get two images into one field of view. Or, in a binocular device, one side can be opto-receiver display, and the other side can be optical view. In other words, the field of view (FOV) is shared by optical image, and electronic display, using any suitable means such as beamsplitter, aperture sharing, and the like.

Generally, using SPOTTR, the operator (JTAC) visually acquires what he believes to be (and is supposed to be) the target. To start off with, he would put the candidate target in the crosshairs of the reticule, in the center of his field of view (FOV). (The field of view is an optical image of the target area.) Then, by observing indications on the display, the operator can determine whether the laser designator is on-target, or off-target. If the laser is off target, the operator (JTAC) can communicate this situation to the designator operator (LDO). Steering commands projected by the display into the field of view (FOV) direct the operator (JTAC) to move the crosshair (re-aim his binocular) to the detected laser spot location. Sets of visual indications ("indicia"), such as illuminated arcs in each quadrant near the perimeter and center of the field of view provide these steering commands, which are essentially right, left, up and down, as well as distance information (close to, far from). All four inner arcs will stay lit when the crosshair is centered on the target.

If the laser is not "on target", the operator (JTAC) can direct the pilot (or LDO) to shift the laser spot (in other words, redirect aiming of the laser) using cardinal directions (N,S,E, W) and distance (such as in meters) to the target (aircraft targeting pods have North arrows and meter sticks on displays).

With SPOTTR, lengthy and sometimes confusing JTAC-to-fighter and fighter-to-JTAC "target talk-ons" are greatly reduced and fratricide potential is virtually eliminated since the JTAC has direct confirmation of the aircraft's designator target location.

SPOTTR is capable of tracking three or more designators in its field of view. The PRF Codes are displayed in the viewfinder and decimal points, for example, may indicate how many lasers SPOTTR is tracking. The JTAC can toggle through the designators selecting the code of the aircraft he is directing.

The primary users are JTACs assigned to Air Support Operation Squadrons attached to Army Brigades/Divisions. However, the SPOTTR tracking capability could also be employed by Special Forces, Marine JTACs and in aircraft.

The illuminated arcs provide somewhat coarse indications of where the laser light is being reflected from, relative to the center of the FOV (cross hairs of the reticule). Although, with two sets of illuminated arcs, one set (306) for "far" and one set for "near", the operator is provided with very ergonomic information which he can react quickly to (in cases where the laser is not on-target), to ascertain what has been illuminated by the laser, and quickly communicate the situation to the LDO operator.

Generally, using a quadrant detector, the display indicates only which quadrant the laser light is coming from (including at the junction of two quadrants), and some information about how far from the center of the FOV the reflected laser light is coming from. With segmented detectors having greater resolution than a quadrant detector, the display may also (or alternatively) indicate to the operator where the laser light is being reflected from, such as by displaying a symbol (such as a small flashing square) to the operator corresponding to the segment at the detected location of the reflected laser light. Generally, if the laser is so far off target that it is not in the field of view, no meaningful information will be presented to the operator. Segmented devices with more than 4 quadrants require extra channels and complexity and it is an object of this disclosure to use a low cost standard quadrant detector.

A numeric display may indicate the laser's PRF Code, the number of designators in the field of view, and signal strength. SPOTTR may track the first three designators it detects operating in its field of view. The number of designators is shown in the eyepiece by decimal points in the code display. The JTAC can toggle between the three designator codes being simultaneously tracked by SPOTTR.

SPOTTR incorporates Gyro-Stabilization, which helps to remove the effects of hand and vehicle vibration. This allows for clearer and easier target identification at long ranges. SPOTTR also serves as a 12× monocular with night vision capability.

SPOTTR incorporates a quadrant tracker developed by Analog Modules, Inc. (Longwood, Fla.) into a widely deployed General Services Administration (GSA) listed M-25 gyro-stabilized binocular manufactured by Fraser-Volpe LLC. The left ocular is replaced with the quadrant tracker to acquire reflected energy from laser designators. Steering information is then projected into the field of view to guide the user to the exact location of the laser spot. The miniature quadrant tracker is mounted on the gyro-stabilized gimbal so that the tracker's sightline is stabilized and remains boresighted to a cross hair in the binocular's right eyepiece. Spot location and the designator's PRF Code are displayed in the user's sight picture. The quadrant tracker is based on the 741DP with the digital processing modified to interface with the SPOTTR display requirements.

Figure 3:
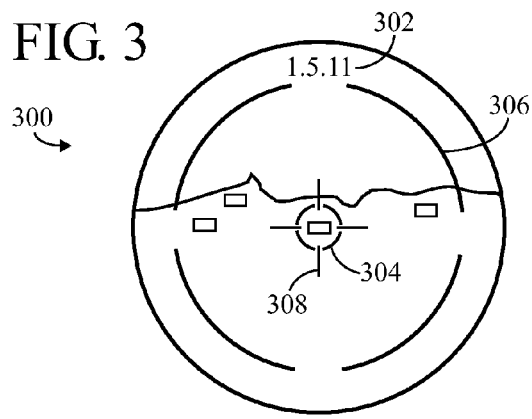

FIG. 3 shows a view through SPOTTR. This is what the operator (JTAC) would see when looking through the binocular (composite device). For example, as illustrated in FIG. 3, 302 Designator's PRF Code. Decimals Indicate number of Designators in Field of View.

PRF code 302 (displaying 1.5.1 1). The display may be set up to multiplex between displaying PRF code and an indication (such as bars, as in cell phone displays) of signal strength.

inner arcs 304 (one per quadrant) and outer arcs 306 (one per quadrant) which light up indicating which quadrant (direction) in the field of view the reflected laser spot is detected as being in, as well as its distance from center of the FOV. When on target (FIG. 3D) all four inner arcs 304 light up.

reticle 308. Optionally, a boresighted reticle can be projected into the visual path, or a simple fixed reticle at the eyepiece focal plane as long as the laser receiver and visual optics are similarly stabilized.

The inner arcs 304 and outer arcs 306 are examples of information that is generated by SPOTTER 210 and displayed to the operator (user, JTAC). The integration of visual image of a relevant portion of the battlefield (containing the target) with information about the laser designator being displayed provides JTAC with meaningful information in a very convenient manner to confirm (and clear, or correct, as necessary) targeting.

Figure 3A:
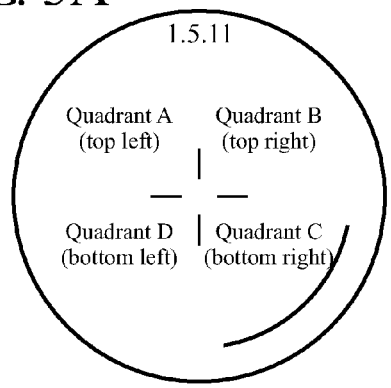
FIGS. 3A-3D are diagrams of the view through the optical target tracking receiver of FIG. 3, under four different circumstances, according to an embodiment of the invention.

FIG. 3A illustrates the view when the spot (reflected laser light) is in the low right quadrant (D), and far from the target. As used herein, "far from" the target may be greater than approximately 10% of the FOV from center. (Alternatively, the threshold for "far from" can be set to be greater than 5%, 20%, 25% and the corollary "close to" would be within (less than or equal to) those thresholds.)

FIG. 3A is also labeled with quadrant designation (A, for top left, 9-12 o'clock; B, for top right, 12-3 o'clock; C, for bottom right, 3-6 o'clock; D, for bottom left, 6-9 o'clock), but these are just labels (legends) in the drawing, and are not displayed to the operator. What the operator (JTAC) will see is an image of the target area, the reticle, and information about the laser light being displayed in the image of his field of view by the electronics.

Figure 3B:
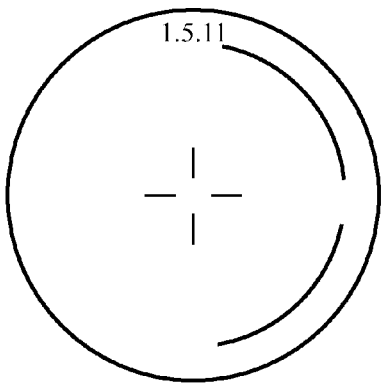

FIG. 3B illustrates the view when the spot is directly to the right, and far from the target. Two outer arcs 306 are illuminated, in the B and C quadrants, indicating that the laser spot is at the junction of quadrants B and C (so, it is generally at the 3 o'clock position relative to the target), and inasmuch as it is the outer, not the inner arcs that are illuminated indicates that the distance from the target is "far" (but within the field of view).

Figure 3C:
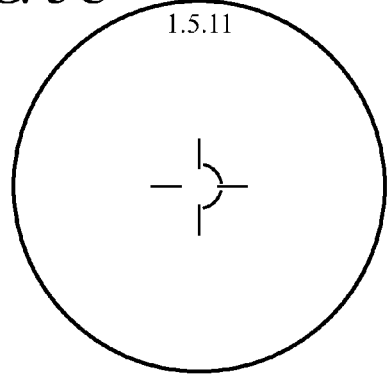

FIG. 3C illustrates the view when the spot is directly to the right, and close to the target. As used herein, "close to" the target may be defined as within (less or equal to) approximately 10% of the FOV from center. Two inner arcs 304 are illuminated, in the B and C quadrants, indicating that the laser spot is at the junction of quadrants B and C (so, it is generally at the 3 o'clock position relative to the target), and inasmuch as it is the inner, not the outer arcs that are illuminated indicates that the spot is close to the target. When the spot is (or becomes) yet closer to the target, a third inner arc may illuminate, and when the spot is on the target, all four inner arcs will illuminate (FIG. 3D).

Figure 3D:
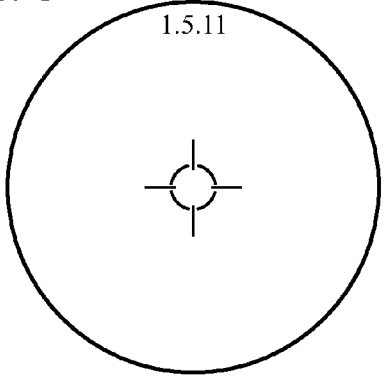

FIG. 3D illustrates the view when the spot is on target. All four inner arcs 304 are illuminated, and may be caused to flash to be more evident to the operator.

Generally, either one or two inner arcs 304 are lit up, indicating a direction from and close to target, or one or two outer arcs 306 are lit up, indicating a direction and far from target, or all four of the inner arcs 304 are lit up, indicating on target. It is also possible that 3 inner arcs 304 can light up, when the spot is very close to the target. It is generally not possible that 3 or 4 outer arcs 306 light up, because the spot is far from center and therefore could only be in one quadrant (one outer arc illuminated) or cross the junction between two quadrants (two outer arcs illuminated).

The aforementioned arcs 304, 306 are merely exemplary of "indicia" that can be used to indicate to the operator the direction and distance of the laser spot from the target. Any other suitable symbology may be used. Generally, this "analog" (symbols) approach is preferred, but digital information regarding direction and distance of the spot from the target could alternatively or additionally be displayed.

SeeSPOT III (described hereinabove) provides an image of the laser spot in the FOV. The laser spot is essentially seen as part of the scene and the spot has to compete with the background for visibility. The image is direct, not internally generated. In contrast thereto, SPOTTR generates indicia which are superimposed onto the FOV—steering information is projected with the scene image.

SPOTTR provides
▶ Fast, Accurate Target Confirmation
▶ Visual Laser Spot Locator
▶ Identify Multiple Designators
▶ Increase Combat Capability
▶ Decrease Fratricide and Collateral Damage Prior to weapons delivery, SPOTTR allows a forward observer to provide positive identification of the target from a safe distance. Effective maximum detector range in clear weather is approximately 10 km in daylight and 17 km at night, allowing significant standoff distance. Visibility performance at night is limited to the optional night vision equipment being paired with the SPOTTR system.

Ground combat personnel (JTAC) pass target information and coordinates (map or GPS aided) to fighter/bomber aircraft using standard "9-line" format. The aircraft (or LDO) fires the laser at the target coordinates from a distance. The JTAC looks through the SPOTTR, identifies the aircraft's PRF Code, and determines if the aircraft is illuminating the correct target (the laser is "on target"). If so, the JTAC can "clear hot" the aircraft to drop laser guided bombs (LGBs) or employ other ordnance with greatly increased assurance that the pilot is on the correct target. This is especially important if friendly troops are nearby in a close air support (CAS) environment.

Exemplary specifications for SPOTTR are:
  Magnification: 12×
  Exit Pupil: 3 mm
  Field of View: 4.3°
  Resolution (Day): 4.3 Sec
  Focus Adjustment: ±5 Diopters
  Power (Internal): 4 Lithium 123 Camera Batteries
  Power (External): 6-30 VDC
  Length (Day): 8.25" (210 mm)
  Length (Night): 9.0" (229 mm)
  Width: 7.5" (190 mm)
  Height: 3.5" (89 mm)

Weight (Day): 4.5 lbs (2.04 kg)
Weight (Night): 5.3 lbs (2.40 kg)
Typical Operational Sequence:
A patrol is taking fire from an enemy-occupied building in a civilian area.
JTAC wants fighter to drop single LGB on the building occupied by enemy combatants.
JTAC passes "9-line" format coordinates.
Fighter enters JTAC derived coordinates and sees several buildings in target area.
Fighter fires laser on a single building.
JTAC confirms SPOTTR is tracking the fighter's Octal (laser) Code.
JTAC confirms that the correct building is targeted by the fighter or JTAC provides directions to shift laser spot to the target building.
JTAC "clears hot" for fighter LGB attack.
The standard 9-line format is as follows:
1. Initial point (IP). A known position on the ground.
2. Heading from the IP to the target.
3. Distance from the IP to the target in nautical miles.
4. Target elevation in feet above mean sea level.
5. Target description.
6. Target location coordinates.
7. Type of mark, smoke, laser, etc.
8. Location of "friendlies" from the target, cardinal direction, and distance in meters.
9. Egress direction and/or control point after attack.

Problem/Solution Statement

As mentioned above, airborne and ground laser illuminator systems are used to designate targets of military significance. To minimize targeting errors resulting in collateral or inadvertent infrastructure damage, SPOTTR provides a method of visually verifying that the designated target is the proper one—in other words, that the object being illuminated ("OBI") is the intended target.

Effective maximum ranges for SPOTTR in clear weather are 10 Km (daytime) and 17 Km (night), allowing significant standoff distance for safety. SPOTTR is an integration of quadrant tracker electronics with existing field-proven stabilized binoculars, for example (NSN 1240-01-410-7418) manufactured by Fraser-Volpe Corporation.

Stabilized binoculars may be used for target spotting. The stabilizer filters out vehicle and hand held motions, while allowing smooth low-frequency movements over the field of view.

Laser designators are used to paint (illuminate) a target, and there exists a need to verify the spot position, or use a laser designator as a pointer to identify objects.

The integration of quadrant tracker electronics with the binoculars can be achieved by removing the left binocular optical system and replacing it with a quadrant tracker that provides direction information displayed in the visual sight. This miniature quadrant tracker is mounted on the gyro-stabilized gimbal so that its sightline is stabilized against external vibration and is boresighted to a crosshair in the right eyepiece reticle. By moving the binocular in accordance with the displayed directions, the crosshair is nulled into the painted spot location. These steering instructions may be presented in the left eyepiece (no external visual path) or injected into the right eyepiece reticle against the view, with extra complexity.

A low-cost subminiature quadrant tracker can provide direction information, and can be adapted for display in the eyepiece of a binocular. Suitable quadrant trackers are available from Analog Modules, Inc. (Longwood, Fla., USA), part nos. 741DP or newer 742DP, described hereinbelow. The spec sheets for these trackers are disclosed and incorporated by reference herewith.

The display format and presentation are flexible, and dimming capability may be provided for good contrast in different light conditions. This may be achieved by duty cycle modulation and may be controlled manually. Further enhancements are possible by displaying the designator PRF band (10, 20 or single shot), and received signal strength by bar displays. The PRF code may also be decoded and displayed, and the presence of multiple targets within the field of view may be noted.

Optionally, Up/Down and Left/Right commands can be provided to a servoed platform upon which the binoculars are mounted to create a tracking mount for larger (than hand held) equipment. An optional infrared (IR) viewer eyepiece provides night vision capability.

The combination of visual observation of the desired target, combined with information about where the laser spot is being reflected from, provides for enhanced coordinated delivery of a laser guided weapon (LGW). The display of information related to the laser light being reflected (direction, distance from target, code), combined with a visual telescope with a reticle or crosshairs to identify the target, and local steering by feedback from this visual information to allows for confirmation of the target (and correction, if necessary) in a small portable package.

Quadrant Tracking Detectors and Processors

The 742DP is a new generation of laser spot tracker available from Analog Modules, Inc. (Longwood, Fla.). The 742DP has wide flexibility for missile and platform tracker applications. The detector is temperature controlled and optimized for 1.06 µm. Independent five channel noise detectors set the lowest thresholds to achieve long acquisition ranges for different background light and spot positions. Serial data output gives channel amplitudes.

It may be noted that the SPOTTR uses comparisons of channel signals by comparators, therefore avoiding the need for A-D converters. In some of the features described below, A-D converters are used to provide signal level data to do some of the calculations.

Optical/Detector

A lens or mirror is used to collect the laser light (from the target designator) and focus it onto a segmented detector, such as a quadrant detector having four distinct (separate) sensing areas (for example, top left, top right, bottom right, bottom left), but other types are possible. Segmented detector of n segments where n>1, detector with inner and outer areas, various detector technologies-silicon PIN is the most common, but silicon APD, InGaAs PIN, InGaAs APD, and others are possible.

The detector suitably comprises APD detectors or PIN photodiode detectors. The APD has a high gain and gives more sensitivity (longer detection range), but is more expensive, needs a regulated high voltage bias, and is sensitive to background light. The PIN detector can have a larger field of view and in both cases, an optical narrowband filter is desirable to allow only the laser light of interest to be visible to the detector.

The most popular laser wavelength currently used for laser target designation is 1.06 µm (microns) with a silicon detector, but future developments may use around 1.55 µm, in which case a detector of InGaAs (indium gallium arsenide) photodiodes may be most suitable.

There is a visual telescope with a reticle boresighted to the laser receiver telescope so that the visual crosshair is coincident with the angle of light arriving from the target onto the detector center. The preferred quadrant detector is typically circular in area with a cross dividing the active area into four equal quadrants. Laser light from the distant target is partly focused by a lens to form a spot on the detector. The degree of focus controls the spot size. When this spot is in the center of the detector, an equal photocurrent flows in each of the four quadrants ("null") and this condition exists when the target is aligned to the reticule crosshair. When the target is in a particular quadrant of the visual field of view, then it is in a corresponding quadrant of the detector and the photocurrent from the laser pulse is amplified and processed to provide an indication of the target position and thus direction to null. The visual telescope is typically fitted with a laser protective glass that absorbs laser light and protects the eye.

Circuit Description

Figure 4:
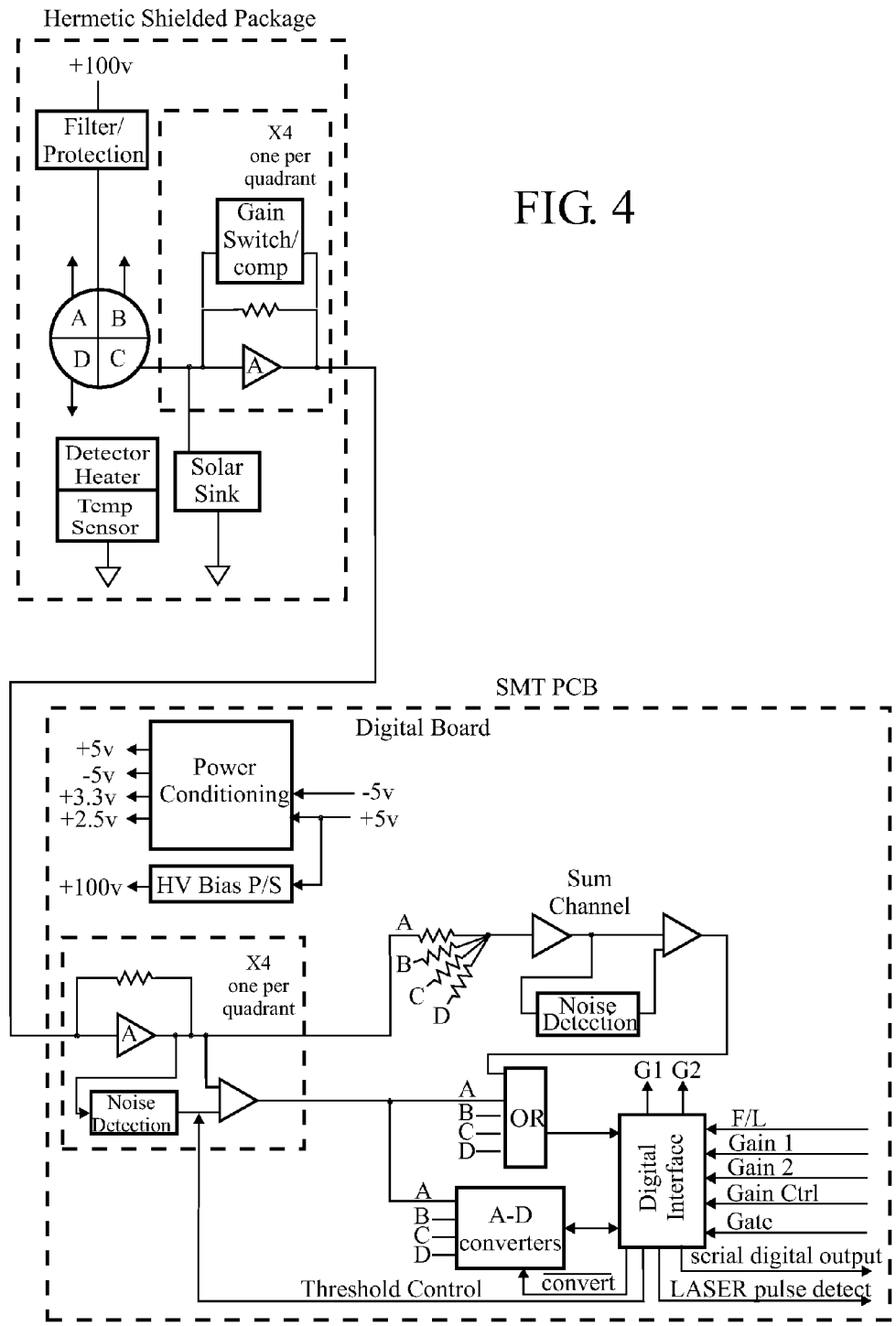

FIG. 4 illustrates exemplary electronics for SPOTTR. Generally, a hermetic shielded package houses the quadrant detector (ABCD), and associated electronics. A signal is output to a digital board which has functions such as noise detection, power conditioning, and the like, as shown, and as described in greater detail hereinbelow. (See also product data sheet for Model 742DP Quadrant Tracking Detector/Processor, Analog Modules Inc., Longwood, Fla., USA, 2 pp, July 2009.)

Analog Electronics

Each quadrant of the photodetector feeds a low noise amplifier, preferably with switched gain. (refer, for example, to U.S. Pat. No. 5,311,353). This allows for a high-gain low-noise operation with weak signals and a low-gain non-saturating mode for strong signals.

A post amplifier may also have switched gain to provide maximum amplification for weak signals and less gain for strong signals, interlaced with the preamplifier gain to provide four gain ranges.

This gain changing is driven from the signal amplitude, typically in the strongest channel, and can also assist in excluding low-level secondary laser reflections as the gain is reduced. The gain range currently in use may be displayed as a measure of signal strength or other methods such as peak detection, peak sample-and-hold, A-D (analog-to-digital) measurement, or other methods apparent to those skilled in the art may be used.

A threshold is set up to separate laser pulses from noise. An exemplary way to do this for the highest sensitivity is as follows:

Summing the signals from each of the four channels creates a sum channel. Each quadrant channel and the sum channel have a separate noise detector to measure the noise independently (five). This detected noise level is smoothed out to form a DC (direct current) level that may be scaled to form a threshold for a fast comparator. The five comparators are OR'ed at the output so that signals crossing the threshold in any of the five channels gives a laser detect output. The scaling is adjusted to set the thresholds at an acceptable false alarm rate. The advantage of the noise detectors is that the threshold is automatically adjusted to keep the signal-to-noise ratio constant (at the acceptable false alarm rate) regardless of variations in temperature or background light. The false alarm rate may be set independently for each channel to maximize the detection sensitivity. Having a threshold comparator in each channel allows increased sensitivity of detection when the signal is in one channel only (compares full signal amplitude with the noise from one channel only), or when the signal is at null (compares full signal summed, times 4 per channel, with summation of four uncorrelated noises, times two of rms noise per channel) The laser detect is a digital signal that is processed for pulse repetition rate (PRF) as described below.

Digital Timing Processing

Two different modes of operation are possible.

In a first mode of operation (Mode 1), the desired code used to distinguish a particular laser pulse train may be set with switches, keyboard, or data lines into the SPOTTR, and all laser pulses are excluded except those that meet the correct timing requirements. The time between pulses, PRF (pulse repetition frequency) of the signals, or code description may be displayed.

A second mode of operation (Mode 2) allows the SPOTTR to look for all laser pulses regardless of code using high gain, within the field of view and simultaneously processes their timing to look for known codes (PRF's). The code or codes may be displayed, and the desired one selected. The SPOTTR then will track the position and strength of this laser pulse train/target whilst excluding the others if present. The presence of other lasers can be indicated. An audible output representing laser pulse train presence and signal strength or PRF can be generated from a pulse train and gain range, and fed to an ear bud or similar acoustical device with variations in sound possible depending on gain range (signal strength) or PRF.

One practical implementation is to use a counter driven by a stabilized and calibrated clock. For each laser pulse that is detected; the counter value (time stamp), direction and magnitude (signal strength) information is stored into a buffer. Each new laser pulse is compared to the existing buffered information to determine if it matches a prescribed pattern (code description). Time stamps are primarily used for determining code description matches but it is desirable to use an algorithm that does not require exact matches. Magnitude and direction information are primarily used to reduce other undesirable effects. This allows multiple signals (of the same or different code descriptions) to be tracked with a high degree of tolerance to false detections, multiple returns, missing laser pulses and clock synchronization errors.

Mode 1 operation is achieved by only outputting information that matches a given code description.

Mode 2 operation is achieved by outputting information that matches any allowed code description and allowing the user to select a code description, after which it will act similarly to Mode 1.

After a code description has been recognized, the buffer information can be used with the counter to predict an incoming laser pulse and adjust operational parameters (such as signal gain) for the expected laser pulse.

Other methods of implementing this function will be apparent to those skilled in the art, and alternative logic may be employed to match different coding methods used.

Direction Derivation

Assuming the use of a quadrant detector, there are several ways to derive the steering directional information. Once a laser pulse is detected by any or all of the comparators described above, then direction-determining comparators may be used to simultaneously sample or compare the amplitude of the laser pulse in the four channels. The simplest method is to compare the signal in opposite quadrants with a comparator and hold the data indicating the strongest. The steering indication on the display is given to steer towards the stronger of the two channels. At null, the steering indication will jitter between the two directions indicating that null is reached. The other two opposite quadrants are similarly compared and the steering direction is similarly displayed. This information is conveniently displayed in the form of four arcs, dots, or other indication each representing a 90-degree segment corresponding to a quadrant in the detector. Note that the detector segments must be appropriately aligned and connected to correspond to the display. The arc or dot lit on the display indicates a signal in its quadrant. To steer the sightline onto the target, the binocular or telescope system is moved to steer the crosshairs towards the lit arc.

The spot image size on the detector can be controlled by the focus of the optical system, and it is arranged to represent typically 5% to 10% of the field of view in angle. By this means it is possible to determine that the target position is near the crosshairs by sensing the spot image of the laser pulse on more than one quadrant. In a typical implementation, a set of fast comparators has a sum signal value divided by (for example) 20, using a resistive divider on one input. The second input looks at the signal in each channel at the time of a laser pulse. An output indicates that sharing is present, and the optional inner arcs or dots lit are used to indicate closeness to null. See, for example, FIGS. 3A-3D.

If the four quadrants are identified as A, B, C and D in clockwise rotational order (starting for example with top left, see FIG. 3A), then a second method of obtaining the directional information is by adding and subtracting quadrant signals. For example, elevation may be a function of (A+B)-(C+D), and azimuth a function of (B+C)-(A+D) where A is the quadrant at 9-12 o'clock. Again, the azimuth and elevation signal strengths may be compared to give a steering direction, or the signals may be digitized using A-D converters and processed digitally to give the desired steering information. A larger spot gives more analog position information at the expense of having to match the channels better for a given angular static boresight error. This sum and difference may be done using analog circuits and normalized by dividing by the sum channel value. These operations are known to those skilled in the art of laser trackers. The direction to the output null is visually displayed to allow target identification by a Spotter.

Detector

The detector may be implemented using avalanche photodiode (APD) or PIN quadrant detectors, for example. The PIN detectors have a wider field of view, are cheaper, but give a range of about 5 Km, compared to ranges of 10 Km (day) and 17 Km (night) for the APD. Conversion from an APD to a PIN diode system only affects the bias control and possibly the optics. The electronic processing circuits are similar. Avalanche photodiodes (APDs) and quadrant detectors are both well known.

APD Size/Field of View (FOV)

It is generally desirable that the APD field of view (FOV) match the FOV of the visual path.

Using, for example, an APD part having a 1.5 mm diameter, with an f 0.8 optic and 30 mm aperture, the APD field of view (FOV) is 3.6 degrees. To match the FOV of the visual path (of the aforementioned M-25 gyro-stabilized binocular), 4.3 degrees is desired, requiring a faster optic design (f=0.7) or smaller collection aperture, both of which are undesirable. One having skill in the art will recognize that such tradeoffs need to be optimized in the detailed optical design, with consideration of the spot size on the detector for accurate boresight and linear area.

There are trade offs associated with the spot size. A small spot gives accurate boresight even with poor channel matching and dirty lenses. This tells which quadrant the target is in with excellent sensitivity as the signal is compared to the noise in only one quadrant. A large spot can give a larger linear region that helps locate the target and keep it acquired in the cross hairs. Too large of a spot results in boresight errors due to dirty lenses, channel-matching tolerances, APD gain tolerances, and spot spillover outside the detector FOV. The sensitivity is reduced because the noise from all four quadrants has to be considered when the spot is split. The spot size is easy to adjust by altering the lens focus on the detector.

APD Bias

The Background light level affects the APD gain that can be used, since the APD has a higher gain to background noise than signal. There is an optimum gain when the total APD noise equals the preamplifier noise. These noise sources are uncorrelated so the resultant noise in this condition is 1.41 (root 2) times the preamp noise. The preamp noise is fairly constant, so a threshold is set at this value (1.41 times preamp noise) and servos the APD bias until this ideal condition is achieved. A small amount of light may have to be injected using for example an LED in dark conditions to keep the bias control loop in a stable range. An advantage of this arrangement is that the best possible sensitivity is automatically achieved in various background light, temperature, and APD voltage tolerance conditions. This noise is measured in a sum channel of all four quadrants. The error signal controls the output voltage of a low noise, +500 volt (maximum) power supply. A narrow band filter is used to minimize the amount of background noise in daylight, thus increasing the acquisition range.

Preamplifiers

Low noise transimpedance amplifiers are used to convert the photocurrents into a voltage pulse. The inputs are protected against an overloading pulse and direct sunlight. Background light causes a photocurrent to flow in the detector that could saturate the high gain preamplifier. AMI has developed a "solar sink" that absorbs this current with out affecting the preamp gain. The preamplifiers are designed for both low voltage and current noise to allow long-range signal detection with the capacitance of either an APD or PIN detector. To handle a wide range of signals, the amplifiers have a switched gain range of 100:1. (A solar sink is a controlled current source that absorbs the photocurrent.)

Post-Amplifiers

The post-amplifiers are optimized for large signal swings and provide a second gain-switched stage to give a total of four overlapping gain stages.

Sum Channel

The four channels are combined in a summing amplifier. The noise in this sum channel is measured and used to control the APD as described above.

Threshold Controls

Although the sum noise is controlled, there will be individual noise variations in each channel Normally the signal is initially in one of the four quadrants, so the best detection range is achieved when the signal is compared to a multiple-of-noise-based threshold in each channel individually. This comparison is done using a high-speed comparator with a TTL output. The noise in each channel is measured and smoothed into a DC value. This value is scaled by an amplifier whose gain is determined by the acceptable false alarm rate (FAR). False alarms are caused when random noise crosses the threshold of signal detection. In this system, improved performance can be achieved because an increased false alarm rate is more acceptable with a visual display compared to an automated tracking system. The output of the DC amplifier is the detection threshold. When a laser pulse signal crosses threshold, a digital output is generated. The outputs of all four comparators are OR'ed to give a common Laser Detect signal.

A-D Converters

The Laser Detect is sent to the programmable gate array that triggers simultaneous sampling of four A-D converters. Each converter measures the close-to-peak value of the laser pulse in its channel, and outputs a digital word representing this value. These words are sent to the programmable gate array (DSP). The gate array generates the signals for the reticule to indicate the direction to move the binocular. This is an alternative to the "bang-bang" method where opposite quadrants are compared.

Display

An intuitive display allows the user to center the target in the null position without obscuring the target. This is achieved with a low-cost display board using surface mount (SMT) light emitting diodes (LEDs).

As an example of a possible display, FIG. 3A shows a target far out of null in one quadrant and provides a single illuminated arc centered in that quadrant and near the edge of the FOV. FIG. 3B indicates that the target is on axis in elevation (up and down in the FOV) by illumination of arcs bisecting the elevation axis and off axis on azimuth. FIG. 3C shows the target driving towards null with the two inner illuminated arcs showing the target is entering the "linear" region where the spot is illuminating at least 3 quadrants. (Two arcs could be illuminated away from the null (at the junction of two quadrants), and a third, opposite quadrant indicator would be illuminated to indicate that the light spot has reached the center region.) FIG. 3D identifies the target in the null position (on target) through illumination of equal spaced arcs in all four quadrants, or equal pulsed or integrated illumination or the four inner quadrants as the comparators jitter equally with split decisions at null.

In addition to the position (close and far) of the illuminated arcs, the intensity of the arcs may be pulse width modulated (PWM) with highlighted reticule areas receiving maximum optical signals. A visual meter (not shown) may be provided to gauge total signal strength and the nominal PRF can be determined and represented on the display.

This represents one of many possible display configurations. The display may be projected into the left eyepiece against a dark background. This is the simplest approach, and the eye will allow superimposition of the display (direction information) onto the target scene. A more complex solution is to project the display into the right eyepiece and combine it with the scene. One having skill in the art will recognize that relatively minor design changes could result in the display being optimized for the preference of the user.

Generally, the spot is initially detected when it is in one quadrant only, giving a steering direction but no absolute position. When the binocular cross-hair 308 is brought closer to the target, linear outputs are generated from multiple quadrants to give more accurate proportional steering information, which may be displayed in a number of ways to pinpoint the target. For example, a suggested method is to steer for equal brightness on all arcs of the aim circle.

Off-Axis Position Target Display

FIGS. 1-4 have illustrated a device (Stabilized Portable Optical Target Tracking Receiver; referred to herein as "SPOTTR") for spotting scatter from lasers illuminating targets, including decoding and displaying laser codes. Some embodiments of the device may include the following. The "S" in "SPOTTR" stands for "stabilized". It should be understood that stabilization is not a crucial part of the invention(s) being described herein.

The parent application (Ser. No. 11/423,367 filed Jun. 9, 2006) discloses:

A method of verifying that a target is being illuminated by a laser from a designator comprises:
providing a composite device, separate from either of the designator or the target, comprising an optical portion having a field of view for viewing the target in the field of view, and a opto-receiver portion for receiving scattered laser light;
viewing the target in the field of view of the composite device; and
displaying information in the field of view of the composite device about a direction of the received laser light from the target;
wherein displaying information about the direction comprises:
providing at least one set of quadrant arcs in the field of view, and selectively illuminating the quadrant arcs to indicate the direction of the received laser light in relation to the target;
wherein providing at least one set of quadrant arcs in the field of view comprises:
providing a set of inner quadrant arcs, and illuminating appropriate ones of the inner arcs when the received laser light is close to a center of the field of view; and
providing a set of outer quadrant arcs, and illuminating appropriate ones of the outer arcs when the received laser light is far from the center of the field of view.

Apparatus for viewing a target and determining a direction and distance of a spot of received laser light comprises:
a visual system, separate from either the target or a source of the laser light, comprising viewing optics for viewing a scene which contains the target;
an electronic system for collecting the received laser light with a segmented detector capable of sensing an angle of the spot of received laser light; means for generating information pertaining to a distance and direction of the spot of received laser light from the target; and
display means for superimposing the information onto a view of the scene which contains the target;
wherein the display means comprises:
a set of inner quadrant arcs which, when illuminated, indicate that the received laser light is close to a center of the field of view; and
a set of outer quadrant arcs which, when illuminated, indicate that the received laser light is far from the center of the field of view.

A method of verifying that a target has been illuminated by a laser designator for illuminating objects with laser light comprises:
viewing the target with an optical portion of a device, in a field of view of the device, wherein said device is separate from the laser designator;
providing indications, in the field of view of the device, about a direction and distance of laser light scattered from an object which has been illuminated by the laser designator with respect to the target;
wherein the indications comprise:
providing a set of inner quadrant arcs, and illuminating appropriate ones of the inner arcs when the received laser light is close to a center of the field of view; and
providing a set of outer quadrant arcs, and illuminating appropriate ones of the outer arcs when the received laser light is far from the center of the field of view.

In a typical scenario, a laser designator operator (LDO) attempts to illuminate an intended target with a laser. However, there may be an error (in aiming), and an object other than the intended target may be illuminated, and this object may be referred to as the Object Being Illuminated (OBI). Ideally, the OBI is the intended target.

Laser light is reflected by the OBI, typically as scattered reflections, and is received (collected) at a tracker device (SPOTTR), which has a segmented multi-element detector capable of sensing an angle (azimuth and/or elevation) of a spot of the received laser light. Typically, the spot is focused on the detector.

The tracker (SPOTTR) has an optical portion with a field of view (FOV) for viewing the intended target. Ideally, the spot of received laser light will coincide with the view of the intended target. However, in practice, the OBI may be other than the intended target. Information about the direction (angle) and distance (close to or far from) of the OBI from the intended target may be displayed in the FOV. (The distance from the tracker to the target—more properly referred to as "range" is generally not necessary to measure, but in some embodiments may also be determined.) The viewing optics may include a visual or infra-red system.

An object of some embodiments disclosed herein is to quickly verify if the OBI is the intended target. And, if not, to quickly determine what corrections (in azimuth and/or elevation) in aiming the laser light are needed.

In some of the descriptions herein, when describing spots of light from the target, although the word "target" may be used, it should be understood that the reflected light comes from the OBI, which may or may not be the intended target.

Reference is made to the following US patents, incorporated by reference herein: U.S. Pat. Nos. 6,097,481, 4,574,191 and 7,659,494.

As noted, for example in U.S. Pat. No. 7,659,494 . . .

The task of the target seeker is to inform where in the field of view of the target seeker the reflected laser spot is present. A common way of achieving this is to use a quadrant detector. A quadrant detector consists of four separate detector elements placed edge to edge in one plane, each of the detector elements being able to view a quadrant of a certain visual field. By measuring and comparing the signal intensity from the four quadrants, i.e. the amount of optical power ending up on each of the four elements, it is possible to determine where the point of balance of the laser reflex is located and thus in which direction to guide e.g. the missile. When the intensity of the signal is equally strong from all four elements the laser reflex is in the centre of the detector and the missile will hit in the middle of the laser reflex. A problem with the quadrant detector is that the accuracy is quite low, which might lead to the missile or the like missing the target.

If a higher accuracy is required in designating the target, the reflex may be focused to an area smaller than the quadrant detector. Then the centre point may be found with higher accuracy but when the reflex is located outside the centre it is not possible to determine how far from the centre it is. This leads to a guide operation which sometimes is referred to as "bang-bang", i.e. strikes are made between the end positions until the reflected beam is in the centre region, at which point a better control may be provided. This means however that a poor aim of the target is the case until the reflex is in the centre. Before that only the quadrant in which the target is located is known.

As noted, for example, in U.S. Pat. No. 6,097,481 . . .

Target acquisition and tracking systems operable with optical energy devices are well known to those skilled in the art. The measure of the position of a laser designated target for example creates a complex problem due to target range and the characteristics of the laser transmitter which generates a low frequency pulse train of narrow optical pulses. An electro-optical system including a servo directed line of sight and quadrant detector are conventionally used in the respective of the target return pulses. Because the field of view of the system is relatively narrow, typically in the order to 2 .degree.-4 . degree., a scanning technique must be utilized which is adapted to ensure that the laser spot falls within the field of view of the detector. Once the target is captured, a servo loop is adapted to respond to tracking error signals to follow the target and accordingly null the tracking error signals.

In typical prior art systems presently known, the measure of position error is proportional and requires a complex analog receiver due to the narrow pulse width of the return signals, the variation of pulse amplitude, and hence automatic gain control with range and noise fluctuations which become a significant factor because of the wide receiver bandwidths required. There inherent limitations have recently been overcome by the use of a digital or "bang-bang" tracker. These systems rather than using a proportional error, use only the algebraic sign of the error and create fixed amplitude servo control signals which force the tracker optics to oscillate in a "limit cycle" about a null error point, whereupon the sign of the error changes as the detector sweeps through the system null or boresight. The limit cycle amplitude, however, is normally quite large particularly for targets which have an apparent velocity in acceleration relative to the line of sight of the tracking system.

This patent discloses a "bang-bang", i.e. digital tracking system for a remote laser designated target having position, rate and acceleration errors. The system is responsive to the sign of the error signal (up/down, right/left) in relation to boresight as opposed to the amplitude of the received signal output from an optical quadrature detector to determine the occurrence of two consecutive zero crossings of boresight following a system gain change where there is a change in sign for consecutive signal detections and as a result thereof reduces the size or amplitude of the digital control step which is utilized to determine the limit cycle of the oscillation of the tracker's optics. Additionally, an estimate of the velocity error is determined from the number of signal detections between successive zero crossings, i.e. from up to down, or vice versa, and left to right, or vice versa and summed with the control step to provide a composite tracking error signal which is applied to a gimbal drive mechanism controlling the tracker optics.

As noted, for example, in U.S. Pat. No. 4,574,191 . . .

The most widely used laser spot tracker techniques employ a conventional quadrant array of photodetectors located in or near the focal plane of a moderately fast optical system. The exact configuration of such systems is usually dictated by trade-offs between signal/noise considerations and field-of-view. For example, a wide field-of-view (FOV) is desirable because of ease of target acquisition and for maintenance of track-lock on rapidly maneuvering targets. A wide FOV however implies larger detector elements. Large detector elements are undesirable from the standpoints of single/noise and the fact that as the detector elements increase in size relative to the image spot size, there is a tendency toward a bang-bang or limit-cycle response. A complicating factor is the effect of atmospheric turbulence on the irradiance distribution at the tracker aperture. If the image is defocused to provide a larger spot size, then entrance aperture irradiance spatial and temporal fluctuations will produce similar fluctuations in the defocused image, with resultant spurious error signals.

This patent discloses a laser spot tracker which uses a focused spot, to avoid the effects of scintillation, thus permitting the use of smaller detectors for an improved signal/noise ratio, yet had a wide field-of-view, as being desirable and useful.

Defocusing the Spot

FIGS. 5 (A-I) and 6 (A-F) illustrate a technique for predicting target position which may be advantageous when the OBI is off-center. Generally, the technique may involve causing the spot (of reflected light on the detector) to be larger (bigger), such as by defocusing the spot to encompass more than one quadrant. For example, a defocused spot may encompass approximately ⅓ of the field of view (FOV, or detector diameter).

Generally, by digitizing and measuring the amplitude of the signal in each quadrant channel, and knowing the spot size, the position of a centroid of the spot can be predicted and compared with the on-axis reference null position as described below.

Note that if the beam circle (spot) on the detector is defocused, the angular size of this possible inner linear measurement area can be varied. In this manner, the actual position of the OBI in this linear area (or linear region) can be predicted, resulting in a faster confirmation. It is also possible to track multiple OBIs simultaneously within this linear area representing various angles to targets (OBIs) as described below.

Figure 5A:
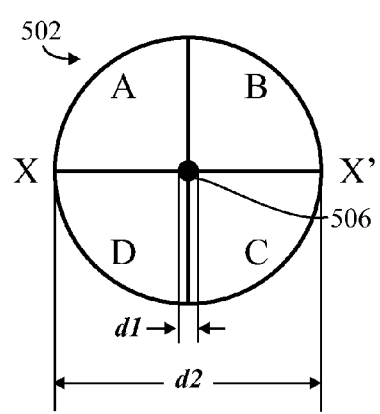
FIG. 5A is a diagram showing a quadrant detector with a spot focused at the center of the FOV, according to an embodiment of the invention.

FIG. 5A (compare FIG. 3A) shows a segmented multi-element detector 502 having 4 quadrants, or segments—"A" (top left), "B" (top right"), "C" (bottom right) and "D" (bottom left). Generally, 4 segments are sufficient to provide for detection of elevation and azimuth, with a minimum of complexity. The detector may be the same four quadrant photodetector (photodiode) as previously discussed.

Figure 5B:
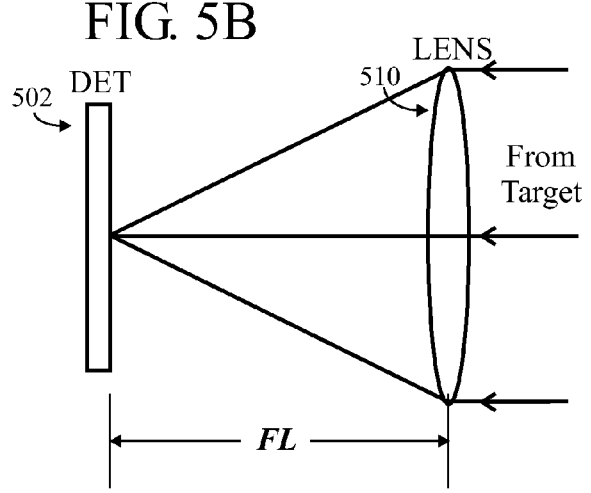
FIG. 5B is a diagram showing light rays from the target being focused by a lens on the quadrant detector of FIG. 5A.

FIG. 5B shows a lens 510 focusing a beam from the OBI (which may be the intended target) onto the detector 502, resulting in a relatively small spot of light 506 on the detector. The spot 506 has a diameter "d1". In this example, the detector 502 may be disposed substantially at the focal plane of the lens 510, resulting in the relatively small spot size. For example, the focal length "FL" of the lens 510 may be 25 mm,
the detector may have a diameter "d2" of 5 mm, and
the spot 506 may have a diameter "d1" of 0.5 mm
the lens 510 may have a diameter of 20 mm In FIG. 5A, the spot 506 is shown "on axis". This will result in an equal signal from each of the four quadrants A,B,C,D.

Figure 5C:
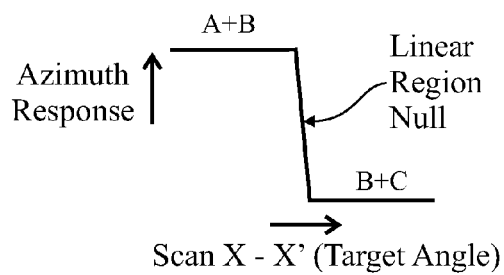
FIG. 5C is a diagram showing a signal (Azimuth Response v. Target Angle) generated by the detector of FIG. 5A.

FIG. 5C shows a steering signal representing the azimuth position data where a positive value is A+D and a negative value is B+C resulting from scanning the spot across the quadrant detector from X to X'. This represents the target (OBI) moving in azimuth. (Either the target could move or the tracker scan in azimuth.) Movements in elevation position may generate a similar scan by adding A and B, and subtracting D and C.

To track a single target position, it is normal to decode the target's pulse repetition signature code, and steer the quadrant spot for equal signal amplitudes in each quadrant (null) so that the receiver sightline is pointing at the centroid of the laser energy on the target.

The linear region (represented by the approximately vertical line in FIG. 5C) represents the crossover between quadrants whose extent is dependent on the spot size.

In FIG. 5C it may be seen that the vertical line is back-slanted a little by the width of the spot 506 in FIG. 5A (linear region). The NULL is the center spot.

FIGS. 5A, B, C represent the "state of the art". The reflected (scattered) light is focused as a small spot on the detector in order to minimize pointing errors due to channel gain imbalance. When the spot is off-axis, it will generally only be in a single one of the four quadrants. (The diameter "d1" of a small spot may be 0.5 mm on a detector having a diameter "d2" of 5 mm.)

Figure 5D:
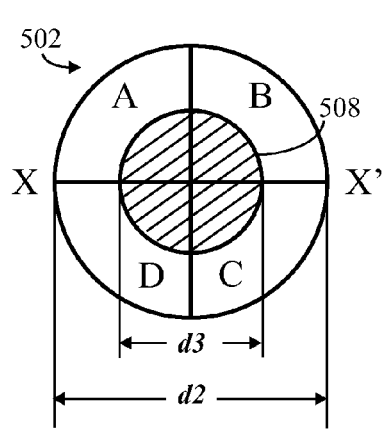
FIG. 5D is a diagram showing a quadrant detector with a defocused spot at the center of the FOV, according to an embodiment of the invention.
Figure 5E:
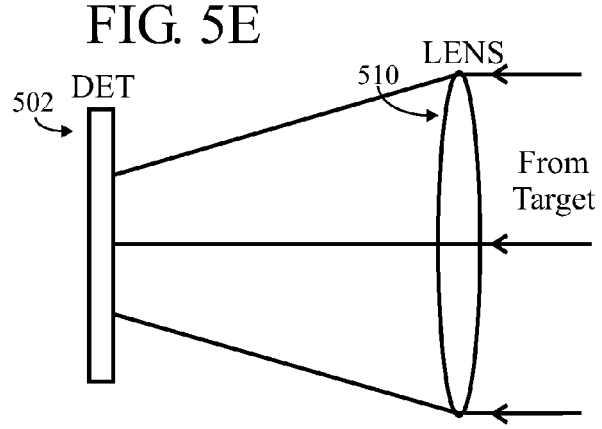
FIG. 5E is a diagram showing light rays from the target being defocused by a lens on the quadrant detector of FIG. 5D.

FIG. 5D, E, F are similar to FIGS. 5A, B, C, but illustrate the effect and results of a larger spot 508 (compare 506). The four quadrant detector 502 may be the same, the lens 510 may be the same, but the detector 502 may be disposed in front of (or behind) the focal plane of the lens, resulting in a relatively larger spot 508 on the detector 502.

According to an embodiment of the invention, the spot size may be increased (made larger) at the detector, such as big enough to typically encompass more than one quadrant of the detector, such as by defocusing or other optical means such as introducing an aberration in the optics to create a larger spot.

For example, as shown in FIG. 5D, a larger spot 508 may cover approximately one-third (⅓) or one-half (½) of the field of view (detector diameter). The larger spot size may be achieved by defocusing, such as by locating the detector slightly in front of or behind the focal plane (see FIG. 5E). For example, the focal length "FL" of the lens 510 may be 25 mm,
the detector may be disposed 2.5 mm in front of the focal plane,
the detector may have a diameter "d2" of 5 mm, and
the spot 508 may have a diameter "d3" of 2 mm.

The size of the spot 508 may be increased sufficiently to cover approximately ⅓-½ of the detector diameter (or the FOV), including at least 15%, at least 20%, at least 25%, at least 30%, approximately 40%, or approximately 50% of the FOV.

The relatively large spot 508 may be several, such as approximately 4 times larger in diameter (hence, approximately 16 times larger in area) than the previously described small spot 506. The relatively large spot 508 may be at least 3 times larger, including at least 4 times larger, at least 5 times larger and at least 10 times larger in diameter than the relatively small spot 506.

A quadrant detector may be positioned near the focal plane of a lens. Laser light rays from a target arrive almost parallel or collimated and are focused by the lens into a spot. The spot size is minimum at the focal plane and expands in diameter as the detector is moved in either direction away from the focal plane, but preferably towards the lens.

According to an embodiment of the invention, the spot may be defocused to produce a relatively large spot, typically half of the detector diameter. The relatively large spot may impinge on all four quadrants of the detector. A signal from each quadrant is independently amplified and the amount of energy on each quadrant is measured. This may be done by digitizing the laser pulse using a D-A converter. All four channels (one channel per quadrant) are digitized with the same time reference so that the value of energy or power of a single pulse arrival in each quadrant can be accurately compared.

If the quadrants are identified as A, B, C, and D as shown for example in FIG. 5D, then variations in the angle of the incoming light will move the spot around on the detector surface and change the energy value on quadrants A, B, C and D. Variations in elevation can be resolved by adding the energy in A and B and comparing this value to the amount of C plus D. Similarly, the azimuth variations can be resolved by adding B and C, and comparing the sum with the sum value of A and D.

By increasing the spot size (508) at the detector, typically a portion (significant fraction) of the spot may be in (impinge upon) at least two of, and most likely in all four of the quadrants of the detector. And, by measuring the signal strength from each quadrant and using simply geometry, the position (azimuth and elevation) of the centroid (center) of the spot may readily (and quickly) be determined. Hence, the elevation and azimuth (both of which are "angles") of the OBI may quickly be determined.

In contrast to this, with a small spot (506) impinging on only one quadrant of the detector, only limited useful information about the location of the OBI (hence, the object reflecting or scattering the light) may be determined—namely, in which quadrant is the spot.

Figure 6A:
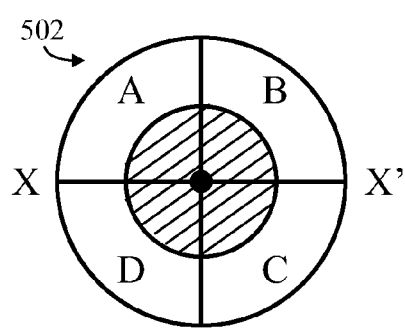
FIG. 6A is a diagram showing a quadrant detector with (i) a spot focused at the center of the FOV and (ii) a defocused spot at the center of the FOV, according to an embodiment of the invention.

The larger spot (508) results in what may be called "spot energy sharing" between quadrants. In other words, for most spots a portion of the spot energy may be in each of the four quadrants. (In this example, the black spot represents the centroid of the spot, not an area of increased energy.) For example, with reference to FIG. 6C,
approximately 15% in quadrant A,
approximately 50% in quadrant B,
approximately 30% in quadrant C,
approximately 5% in quadrant D The energy from each of the quadrants can be measured essentially simultaneously in time, and a look-up table (or other means) can be used to determine the centroid of the spot. (In contrast with the off-axis example of FIG. 6C, if the spot were centered as shown in FIG. 6A, substantially equal amounts (25% each) of the energy would impinge on each of the four quadrants.)

Figure 5F:
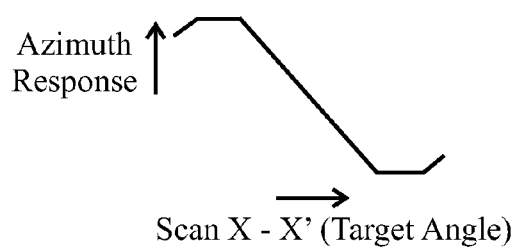
FIG. 5F is a diagram showing a signal (Azimuth Response v. Target Angle) generated by the detector of FIG. 5D.

Note in FIG. 5F (in contrast with FIG. 5C) that the linear region is larger. Also note that near the edges of the detector there is some fall-off (droop) of the signal.

Light scattered by the object being illuminated ("OBI") is received (collected) at the tracker. By digitizing and measuring the amplitude of the signal in each quadrant channel, and knowing the spot size, the position of the energy centroid can be determined with respect to the on-axis references (equal signals in each quadrant). (The spot size is determined by the optical design and mechanical alignment.) The angle off null in each axis is known from the centroid distance "d" from the axis of interest. See FIG. 6C for d in azimuth. The angle in azimuth from null is d/FL where FL is the focal length of the focusing lens. The elevation angle may be similarly calculated using the centroid distance from the X-X' axis, divided by the focal length (FL). The distance d can be predicted by solving known geometry equations calculating the area of the spot above and below the axis orthogonal to the axis of interest. In practice, the spot will not have a sharp cut off and it may be preferable to use a look-up table tailored to the optical system. Such a table would convert the energy above and below the orthogonal axis segments into degrees from null in the axis of interest. This may be referred to as the "angle measurement" mode of operation.

For some examples of illustrative known geometry equations, reference may be made to:

*AJ Design, Circle Segment Equations*, incorporated by reference herein. The website http://www.ajdesigner.com/phpcircle/circle_segment_area_k.php shows the circle equations. Solve for t as a function of segment area compared to residual area to get the centroid offset for one axis and divide by focal length to get the angle from null in radians. This is mainly theoretical as the spot is never perfect, and a lookup table may be used to relate the two values.

In contrast with the techniques being disclosed herein (in this continuation-in-part application), SPOTTR (210) does not digitize or measure the value of signal in each quadrant, it just compares the levels between quadrants in a digital way. The operator keeps steering around and close to null trying for null based on the largest signal. Because there is no linear region, SPOTTR is what may be referred to as a "bang-bang" system. Compare U.S. Pat. No. 6,097,481.

An advantage of using the technique(s) disclosed herein is being able to know (calculate) how far from null the angles (azimuth and elevation) to the object reflecting the light ("OBI") are. Consider the common situation where the OBI is not at null. (If the OBI is at null, nothing more is needed.) Generally, in the prior art, with a small (focused) spot, only limited information may be determined from an off-axis OBI—namely, in which quadrant is it—and it is necessary to steer to null (move the tracker towards the spot until the signal is nulled). Using the technique(s) disclosed herein, with a larger spot size, the angles may be determined "immediately", without requiring steering to null.

A large spot (such as 508) typically degrades the angular static boresight accuracy of the center null position because errors in channel matching create a greater angular offset to balance the signal amplitude error at null (equal signals in all channels) with a large spot. A smaller spot (such as 506) may lose a little signal at the quadrant interface. The photocurrent is proportional to the total power incident on the detector quadrants regardless of spot size.

"Composite Spot"

Figure 5G:
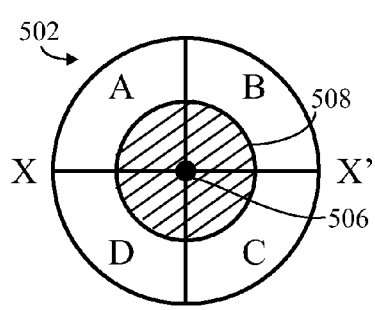
FIG. 5G is a diagram showing a quadrant detector with (i) a spot focused at the center of the FOV and (ii) a defocused spot at the center of the FOV, according to an embodiment of the invention.
Figure 5H:
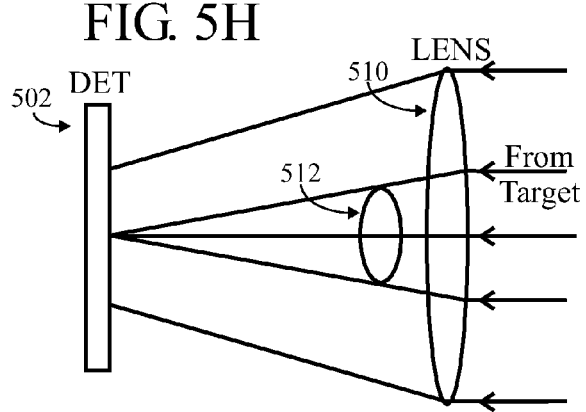
FIG. 5H is a diagram showing light rays from the target being defocused by a lens on the quadrant detector of FIG. 5G.
Figure 5I:
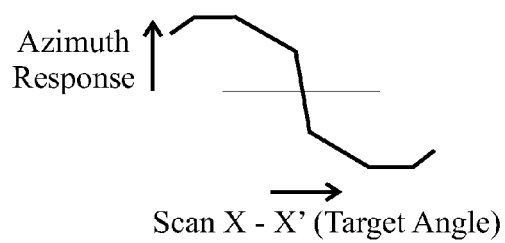
FIG. 5I is a diagram showing a signal (Azimuth Response v. Target Angle) generated by the detector of FIG. 5G.

According to another embodiment of the invention, as illustrated in FIGS. 5G, 5H, and 5I, an optional approach to trade some off-axis directional error (due to a lower signal to noise ratio) for on-axis (null) accuracy is to defocus only a part of (a portion of) the collected energy (reflected light). (In the example of FIGS. 5D-F, all of the light was defocused.) This may be accomplished by adding an optical component such as a glass plate 512 in the focusing rays (see FIG. 5H) to focus only a part of (a portion of) the energy ("focused beam component") on axis, and defocus (or allowing to remain defocused) another (remaining) part of (a portion of) the energy ("defocused beam component") in a larger spot. This optical component (512) may be integrated into the main lens or lens components. The optical component may comprise a plate, multiple, or tailored lens within the optical path (within the optical system).

The composite spot thus comprises a focused beam component (corresponding to the small spot 506) and a defocused beam component (corresponding to the large spot 508). How much of the energy is focused versus defocused may typically be between 20% to 50% of the energy is focused, and between 80% and 50% of the energy is defocused. The relative amount of energy in the focused and defocused portions of the beam may be selected depending on trade off between boresight accuracy at null and accuracy of angle to OBI away from null.

FIG. 5G illustrates a focused spot 506 ("focused beam component") impinging on the quadrant detector 502 (compare FIG. 5A), and a defocused (larger) spot 508 ("defocused beam component") impinging on the quadrant detector 502 (compare FIG. 5D). The two spots 506 and 508 may be coaxial and together may be referred to as a "composite (focused/defocused) spot". (Having the two spots coaxial is preferred, since if they were not coaxial the estimate of centroid would be more complex.)

The defocused spot 508 may be much larger than the tightly focused spot. For example, as mentioned above, the defocused spot 508 may occupy approximately 33% (one third) of the field of view, while the focused spot 506 may occupy only a few percent (such as 1%-5%) of the field of view. The defocused spot 508 may be at least 100% larger (in diameter than the focused spot 506, such as least twice as large, three times as large, five times as large, ten times as large, etc. (It is generally more useful to discuss diameter rather than area since diameter relates directly to angle to target.)

As noted above, for a large spot size (508) there is a loss (droop in the signal) at the edge of the detector with large spots falling off and this is a restraint on spot size.

FIG. 5I shows the azimuth signal response as defined below through section X-X' in FIG. 5G with a circular plate 512 fitted as shown in FIG. 5H. (FIG. 5F shows the azimuth signal response as defined below through section X-X' in FIG. 5D without the circular plate 512 fitted.)

In FIG. 5I it may be seen that the vertical center line is back-slanted a little to match the tightly focused spot 506 as it moves across the detector. As the spot 506 crosses the axis, the energy moves from the left set of quadrants (A,D) to the right set (B,C) with the linear region as the spot straddles both sets.

After processing (described below) it is apparent that the null crossing rate, as a function of target angle, is faster for the focused beam component (506) as shown by the quasi-vertical line in FIG. 5I. This approach gives a combination of a wide linear field of view with some target position definition, and good centroid angular definition at null.

Signals from the Detector

FIGS. 6A,B and 6C,D show examples of signals and spot images on the detector, such as resulting from a large homogeneous spot with the black dot indicating the centroid of the large spot. The figures are also illustrative of a composite spot (such as shown in FIGS. 5G,H,I) with the black spot representing the focused portion of the composite spot.

Figure 6B:
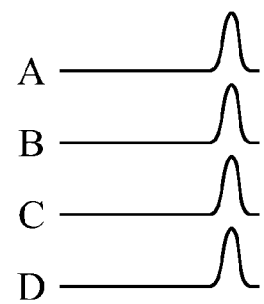
FIG. 6B is a diagram showing signals from the four quadrants of the detector of FIG. 6A.

FIG. 6A shows the target located on the boresight at null (target axis on null) with equal signals in each quadrant. FIG. 6B shows that signals from each of the four quadrants (A,B,C,D) of the detector 502 are substantially equal in this case.

Figure 6C:
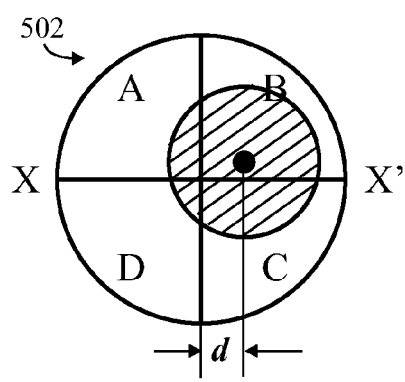
FIG. 6C is a diagram showing a quadrant detector a focused spot and a defocused spot both off-center of the FOV, according to an embodiment of the invention.
Figure 6D:
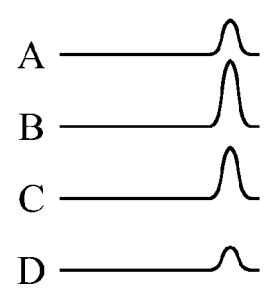
FIG. 6D is a diagram showing signals from the four quadrants of the detector of FIG. 6C.

FIG. 6C shows a composite spot mostly in quadrant B (target centroid in quadrant B), where a signal centroid in quadrant B results in signals of different amplitudes in each of the four quadrants (A,B,C,D) of the detector 502. This illustrates tracking a target (OBI) which is not at null. FIG. 6D shows the signals from the four quadrants (A,B,C,D) of the detector 502. These signals are processed to determine the position of the black dot (centroid) with respect to the null position or cross hairs in FIG. 6C. In this example, "d" represents the azimuth angle (or offset) from null. In FIG. 6C, there is also a small elevation offset of the black dot above the horizontal centerline.

Another possibility is that the large (or composite) spot is entirely in one of the quadrants, such as quadrant B. See FIGS. 6E and 6F. FIGS. 6A-6F are illustrative of a single large homogenous spot having a centroid, as well as a composite spot having focused and defocused portions. Generally, the calculations for a composite spot would be more complex, with a big drop in signal as the center spot goes off null.

Figure 6E:
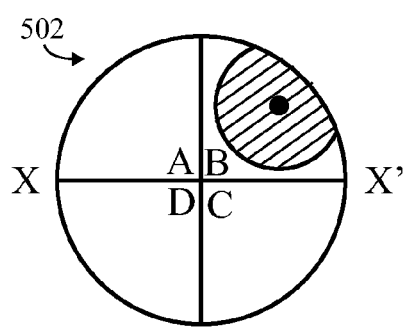
FIG. 6E is a diagram showing a quadrant detector with a focused spot and a defocused spot both off-center and entirely within a single quadrant, according to an embodiment of the invention.
Figure 6F:
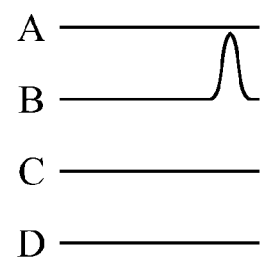
FIG. 6F is a diagram showing signals from the four quadrants of the detector of FIG. 6E.

In FIGS. 6A, 6C, 6E if the black spot may also be taken to represent the centroid of the large defocused spot (assuming equal energy density across the spot). These figures are merely illustrative.

One option in some of the embodiments disclosed herein is that the tracker does not have a display. The main thrust of the techniques being disclosed herein is to quickly determine angles, using the big spot (or the composite spot). A display is not part of that calculation. A display however has many uses and is simple to incorporate into the apparatus. For example, in the alignment use an operator would look at boresight error. With multiple targets an operator could chose the correct target or correct laser designator. Usually the operator would end up nulling the one of interest to get good accurate confirmation to confirm the target.

In SPOTTR device 210 described hereinabove, the operator steers to a bang-bang null always on one target only to confirm that the OBI is the intended target. The tracker disclosed here provides the ability to know about other targets and their approximate position, or to know how far off boresight a co-located laser is. The tracker initially points in the direction of suspected targets or the co-located laser line of sight. Usually after target selection and steering as this provides the best angular accuracy. The boresight error in x and y is known and may be used to confirm designator alignment or correct for alignment error electronically or mechanically. The point is that the error is known and various actions may be taken depending on the application. This is important if the designator is an add-on device, or if night vision with some laser viewing capability is an add-on device. The data can aid in the harmonization of the devices. It is important to minimize boresight errors between electro-optic systems to avoid collateral damage and to ensure weapon effectiveness with accurate aiming.

Tracking Multiple Targets

Using the technique(s) disclosed herein thus provides the ability to track more than one target. A typical spot duration may be 20 ns, with pulses occurring every 50 ms (20 pulses per second).

The angle measurement mode of operation described above where the energy in spot quadrant segments is measured simultaneously in time and allows multiple off-axis targets to be identified by their pulse repetition codes, and the angles to these targets to be separately measured and displayed.

This mode may also be of value in measuring and allowing correction of boresight errors, such as between a co-located laser designator, an infrared viewing device, and the reticle display. To accomplish this, the receiver and optics may be substantially identical to that previously described, except that the spot size on the quadrant detector is typically made to be larger, as described above, and the display may show the spot position as defined by the derived X and Y co-ordinates output from the DSP.

It may be noted that the SPOTTR device 210 described hereinabove displays only quadrant and null information (see, for example FIG. 3). The large spot (defocused, including defocusing only a portion of a composite spot) techniques described herein provide spot (OBI) location from the DSP (FIG. 4A) azimuth and elevation outputs. The x and y (azimuth and elevation) data can be fed to a display like an LCD array to illuminate a marker (see, for example FIG. 9), or the x and y data can be used directly to indicate the direction and magnitude of error and correction required to bring the laser into boresight.

In the SPOTTR device 210 described hereinabove, the arcs in the display were designed for the bang bang system where the inner and outer arcs may be derived from the use of comparators only (outer arcs if the spot is not in opposite quadrants; inner arcs displayed if the spot is near null with energy in multiple quadrants).

In the present tracking device, the energy in each quadrant is measured (with A-Ds) to determine the spot centroid x and y so that actual positions are available, at the expense of more complexity.

In SPOTTR device 210 described hereinabove, the operator is able to view the target (and is presented with a display what general direction and a coarse indication of how far off-target the OBI is). Providing the capability for the operator to view the target is generally optional for the tracker embodiments disclosed herein.

Description of Circuit

Figure 4A:
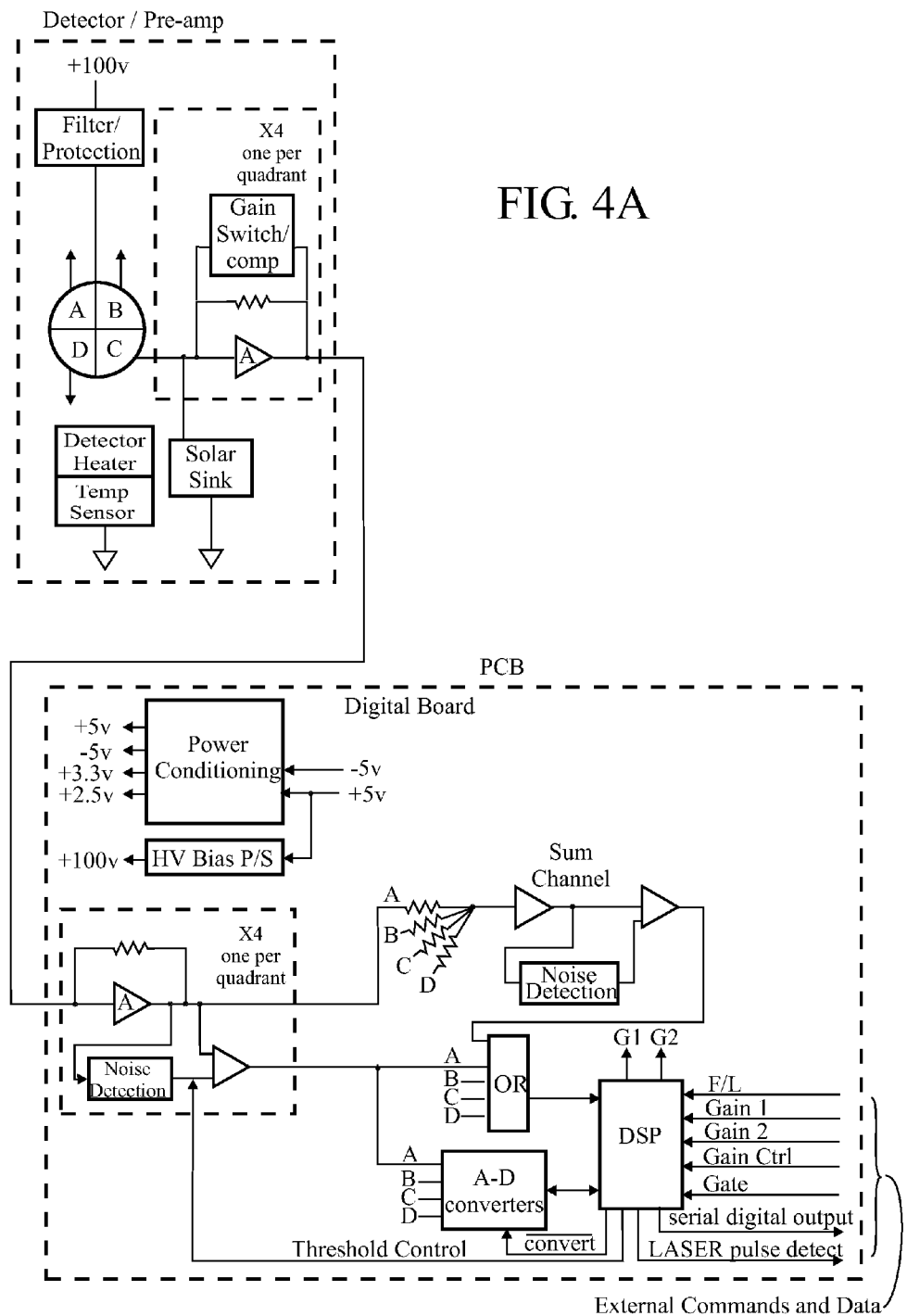

Refer to FIGS. 4 and 4A. The analog output signals from each quadrant channel are measured for each laser return and processed to determine the position of the spot or spot centroid within the field of view. For multiple designators, this may be done by tracking each laser pulse repetition code and setting time gates around each return. The amplitude of the signal in each channel within the decoding time gate may be measured by a pipeline A-D (analog-to-digital) converter, and this amplitude data may be time-tagged and stored in a digital signal processor (DSP) such as a field programmable gate array (FPGA).

Generally, the circuitry used to implement the various technique(s) disclosed herein may be substantially the same as shown in FIG. 4, with the exception that a digital signal processor (DSP) (FIG. 4A) may be substituted for the Digital Interface (FIG. 4) to perform the calculations, using known geometry equations or a lookup table.

The A-D measures points like a digital oscilloscope. These points may be mathematically processed in any way desired to distinguish hard targets from backscatter, clouds, smoke, etc. as measured in LIDAR systems.

The "back end" display methodology of using inner and outer arcs to indicate direction and distance of the spot from the target may be used with the various "front end" techniques disclosed herein. Other display methodology may be employed, or the XY values may be used directly to correct boresight by offsetting an existing display reticule, displaying an offset amount, or being input to a weapons computer to make a correction.

The inner and outer arcs described above (FIGS. 3-3D) do not really show the exact spot centroid position, only the quadrant and an indication of distance of the OBI from the target ("close to" or "far from"). With the techniques described with respect to FIGS. 5 and 6, more detailed information may be displayed, as shown for example in FIG. 9.

Calculations

Generally, azimuth and elevation angular co-ordinates for the OBI may be calculated by measuring energy of the received laser light in each quadrant. This may be accomplished by adding signals from the quadrants on each side (or top/bottom) of an axis of interest, and deriving the ratio of these quadrants such that that ratio varies as the spot traverses the quadrants across the axis of interest. Knowing the focal length of the optical system, the x and y position of a centroid of the spot can be determined (re-scaled as an angle to target) referenced to the center boresight crosshairs where all quadrants are equal.

The centroid of the spot represents the angular position (elevation and azimuth) of the object being illuminated ("OBI") in the field of view (FOV). With additional range information ("range" is distance from the tracker to the OBI), the position of the OBI may be determined.

The calculations set forth below may be performed in the DSP (FIG. 4A), but could alternatively be done by analog means using summing and subtracting operational amplifiers as is commonly known.

Generally, there are 4 channels "A", "B", "C" and "D", each representing a quadrant in the field of view (FOV). The channels "A" and "B" are "UP channels". The channels "C" and "D" are "DOWN channels". The channels "B" and "C" are "RIGHT SIDE channels". The channels "A" and "D" are "LEFT SIDE channels".

The sum of the signal amplitudes received in all 4 channels, A+B+C+D, may be added (summed) to give a "total or sum signal".

Consider the case of a single axis, for example azimuth (elevation may be treated identically). As the spot is scanned across the surface of the detector in a direction normal to the axis, due to the angle of incident light changing caused by a far field target moving across the field of view, the ratio of (B+C)/(A+D) changes in a non linear manner due to the spot shape and the energy falling off the detector (FIG. 6E). In a conventional null-seeking tracker this is not critical as long as the quadrant energies balance at null, but here (operating off null) the spot angular transfer function is linearized, creating data to allow a prediction of the target angle. By knowing the target angle vector components in azimuth and elevation, the actual target angle and direction from the boresight can be derived using conventional geometric calculations.

The signal output by the two "UP channels" A and B may be summed And, the ratio of the UP sum, A+B, to total values, A+B+C+D, provides a measure of the spot position in elevation. Alternatively, the ratio of the two "DOWN channels" C and D may be summed (and divided by A+B+C+D) to provide a measure of elevation.

A similar process may be performed to determine azimuth using the sum of two side channels, such as A+D or B+C, and dividing by the total A+B+C+D.

These elevation and azimuth calculations may be performed in the DSP, but could be done with older technology using an analog multiplier chip used in the division mode as shown in application notes such as the AD534 data sheet by Analog Devices Inc. See FIG. 6 therein.

| Elevation ratio: | $(A + B)/(A + B + C + D)$ |
| Azimuth ratio: | $(B + C)/(A + B + C + D)$ |
| Alternatively | |
| Elevation ratio: | $(C + D)/(A + B + C + D)$ |
| Azimuth ratio: | $(A + D)/(A + B + C + D)$ |

This gives a ratio between 0 and 1, with 0.5 representing when the imaged spot (either focused or defocused) is centered at null. (See FIG. 5A, black spot 506). (When the spot is centered at null, this indicates that the OBI is the intended target.)

The ratio derived from the spot energy sharing between quadrants may be corrected to represent angle off-boresight in the axis of interest by means of a look up table in the DSP, solution of a differential equation representing the transfer function in the DSP, or by passing the ratio value through a non-linear analog circuit to correct for the non-linearities of the transfer function from detector spot position, to angle of target from boresight.

The techniques disclosed herein may be incorporated into a tracking device such as SPOTTR 210 to provide accurate stand-off verification of target illumination by airborne or ground laser designators (110). SPOTTR is designed to allow an operator (Joint Terminal Attack Controller (JTAC)) on the ground near the target area, to detect and decode laser energy from an airborne or ground laser designating military targets.

The techniques disclosed herein (such as in FIGS. 5 and 6) may be incorporated into a weapon pointing system. For example, normally the sightline of a tracking device is servo driven or the missile is steered to make A+B equal to C+D for a null in elevation Similarly in azimuth (make A+D equal to B+C for a null in azimuth).

Output and Display

Having thus determined the centroid of the spot, an output may be provided (and displayed) representing elevation and azimuth of the spot relative to a boresight direction and reference orthogonal axes. The display can be the inner and outer segments described hereinabove (see, e.g., FIG. 3). Alternatively (not shown), the output could be a marker/icon tagged with PRF ID, or a circle or shape of varying size representing the uncertainly of target position. As the target moves from the null, the icon could get larger, eventually becoming a quadrant. Outputs representing elevation and azimuth relative to a boresight direction, of multiple targets each tagged with their code to allow for identification of the designator. See FIG. 9.

The detector (502), usually a silicon or InGaAs PIN or APD, converts the light photons into electrical current, and the preamplifier, A, in FIG. 4 (or 4A), converts the current into a time variable voltage that is processed. The area of the pulse, peak value, an average of samples, or various other characteristics of the pulse shape and amplitude may be measured and used to determine the laser pulse validity, direction, as well as to minimize noise and false pulses. The A-D converter in FIG. 4 (or 4A) may be capable of sampling every few nanoseconds to allow the pulse shape to be recreated in digital numbers within the DSP for digital processing of amplitude values and shapes.

Pulse shape measurement may be used to enhance and validate target. For example, the area of the pulse, peak value, an average of samples, or various other characteristics of the pulse shape and amplitude may be measured and used to determine the laser pulse validity, direction, as well as to minimize noise and false pulses.

Initially, a "false alarm" rate may be set up at a value that does not cause unacceptable false code locks, for example 1 false lock per hour (or whatever is tolerable in the system). Each pulse (and false alarm) is time tagged and sequences of pulses that represent a valid code are recognized by lock conditions, for example 4 pulses correctly timed out of 5. In the traditional way, gates are set up to track these sequences. Each code recognized works independently with its own gates. After achieving lock with any valid sequence (one laser designator), the pulse amplitude in the gate may be simultaneously measured on all four channels and processed to derive the elevation and azimuth ratios as described above. This process may be conducted independently on each valid coded sequence, to provide known codes and angle (elevation and azimuth data) for each of multiple targets. This data may be corrected to represent the correct angular position of the source.

The tracking device disclosed herein allows for the conversion of collected (received) signal to angular position of the target (or multiple targets) off null. The elevation and azimuth ratios are generally not a linear function of angle from null, due to the geometry considerations above, optical aberrations and spot size, and especially if the combined approach of FIGS. 5G,H,I is used. A lookup table may be used to convert these ratios into elevation and azimuth angles from null (boresight direction). Corrections for scale and offset may be included in the lookup table to enhance the accuracy of the target angles from boresight (null position). The set of elevation and azimuth angles for one particular coded laser may be used to generate a marker in a display that may be tagged with the code detected, by feeding x and y co-ordinates, or converting the x and y co-ordinates into display pixel positions (a typical display may have 640 by 480 pixels), based on the angles calculated by the tracker. Other designated targets may be processed in the same way to give their position within the field of view, where the spot is shared by more than one quadrant.

As the target moves to the extremity (edge) of the field of view (FOV) represented by the spot diameter, the accuracy may suffer due to variations in the spot cut-off characteristics. At the edge of the FOV, the quadrant direction and code of the target may be indicated, and its position may be accurately defined by moving the boresight towards that target to bring it closer to the null region where relative amplitudes of the spot in multiple quadrants may be accurately measured.

According to another aspect of the invention, it is known that the quality of the spot image can vary on a pulse-to-pulse basis due to atmospheric turbulence when the spot size gets large, and can be affected by the window variations (see, e.g., U.S. Pat. No. 4,574,191). The techniques disclosed herein provide not only a means of greater field of view (FOV), but to use typical binocular FOV's of 4 or 5 degrees. Although the predicted position accuracy of targets away from null may degrade, the accuracy may be improved if the boresight is moved towards these targets.

Calibration

At manufacture, the spot may be scanned across the detector using representative optics. The function of azimuth/elevation ratio related to angle from boresight (null position) may be measured and set into a look up table. This may be a one time calibration for that design, measured and input for each part, or set up to calibrate automatically during test. These calibration constants may be set up for each gain setting, in both azimuth and elevation. Other methods of accomplishing this function are possible, such as setting equations to represent the transfer function and solving those for the corrected angle. When the ratios are calculated from a particular laser spot, the ratio may be modified by the appropriate look-up value to yield the angle and direction sign from boresight. The angular values may be displayed on a screen represented by a target position spot and tagged with the associated code, fed out to a weapon system, or imaged onto viewing optics, visual or infrared. See FIG. 9.

Minimizing Effects of "Hot" Spots by Using Two Detectors

A small, focused spot (such as 506) crosses the linear region in a small angle. Therefore, inconsistencies of amplitude within the spot may have a small effect on angular accuracy to the sightline to the target. However, a large spot (such 508) may be sensitive to "hot" (or "cold") spots (in general, non-homogeneities) caused by dirt or defects in the optics, and may exacerbate angular errors.

For purposes of the discussion that follows, techniques for more accurately determining the centroid of a large spot with a hot spot will be discussed.

This section of the disclosure (and FIG. 7) deal with some practical difficulties of using the large spot away from the focus, and thus makes those embodiments of the invention more useable.

With a defocused spot (508), the spot centroid position can be affected by vignetting, smudges on the lens, low energy spots, or hot spots, in the collected optical energy.

Techniques are disclosed herein for reducing these effects, collectively referred to as "hot spots".

Generally, the solution described here is to have (dispose) one detector in front of the focal plane (FP) and another detector behind the FP. Because both detectors are disposed at other than the FP, the spots impinging upon both detectors will be relatively large spots (such as 508). Also, because one detector is in front of and the other detector is behind the FP, a hot spot in the relatively large spot will be located in a diametrically opposed quadrant of the one detector as compared with the other detector. By combining (adding, or averaging) the outputs of the two detectors, undesired hot spot effects can be significantly reduced.

Figure 7A:
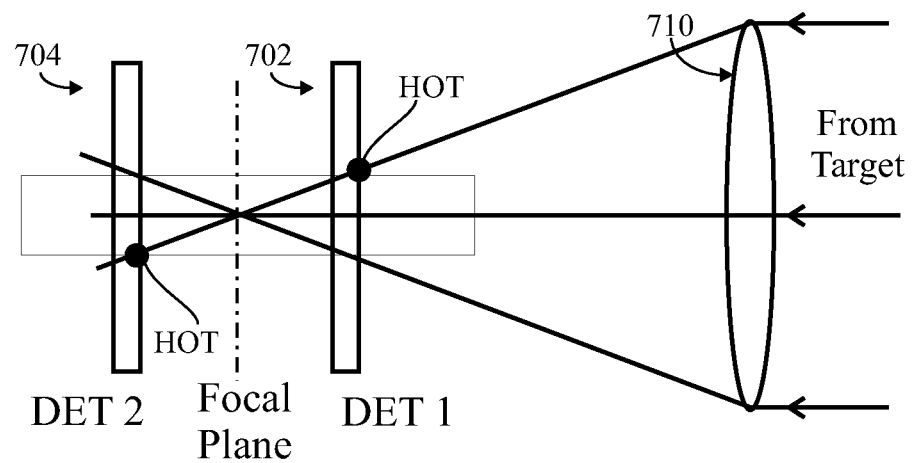
FIG. 7A is a diagram showing an embodiment of the invention with two quadrant detectors, one (DET 1) in front of the focal plane, the other (DET 2) behind the focal plane.

FIG. 7A shows two detectors, a first detector (DET 1) 702 and a second detector (DET 2) 704. Both detectors 702 and 704 may be the same type as the previously-described detector 502. The two detectors may simply be connected in parallel with one another. Since the preferred detectors are current sources, the currents will sum just by making a connection. The currents flow typically into a transimpedence amplifier that gives a voltage output proportional the current input.

As illustrated in FIG. 7A, the two detectors (DET 1 and DET 2) may be arranged coaxially, one in front of the other, with the focal plane of the lens 710 between the two detectors. For example, one detector (DET 1) 702 may be disposed in front of the focal plane closer to the observed target (closer to the lens 710), and the other detector (DET 2) 704 may disposed behind the focal plane. (The focal plane is disposed between the front surfaces of the two detectors.)

This embodiment (FIG. 7A) takes advantage of the fact that materials such as silicon are semi-transparent at 1.06 μm. Since the received laser light impinges first on the first detector (DET 1) 702, the thickness of the first detector (DET 1) may be selected for approximately 50% of possible absorption (energy collection) at the wavelength of interest, typically 1.06 um. The absorbed light may be converted into current.

Figure 7B:
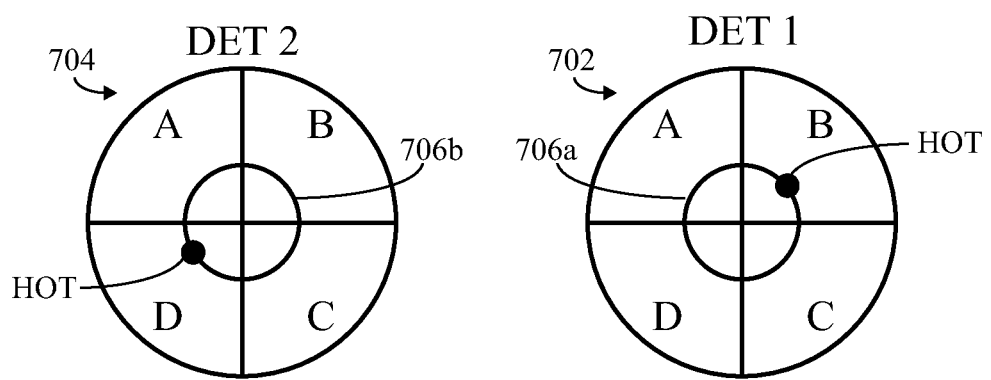
FIG. 7B is a diagram showing a "HOT" spot focused on diametrically-opposed quadrants of the two detectors (DET 1 and DET 2) of FIG. 7A.

In FIG. 7B, the defocused spot of light 706 is shown as 706a on DET 1 and as 706b on DET 2.

The remaining approximately 50% of light which passes through the first detector (DET 1) impinges on the second detector (DET 2). The thickness of the second detector (DET 2) may be selected for substantially 100% absorption at the wavelength of interest, or at least a goal of the same quantity of light as absorbed by an opposite quadrant in DET 1 when reflections and thicknesses are taken into account. The absorbed light is converted in to current.

FIG. 7B shows the two detectors (DET 1 and DET2), and how a hot spot ("HOT") is caused to be located in diametrically-opposed quadrants of the two detectors.

Generally, by using two detectors, and arranging them for detection before (in front of) and after (behind) the focal plane may reduce this error.

The combination of DET 1 and DET 2 shown in FIGS. 7A and 7B may be referred to as a "dual level detector" with the focal plane set between the two detectors. The two detectors DET 1 and DET 2 may be equally offset from the focal plane, for example (compare FIG. 5D):

the focal length "FL" of the lens 710 (compare 510) may be 25 mm,
DET 1 702 (compare 502) may be disposed 2.5 mm in front of the focal plane,
DET 1 may have a diameter "d2" of 5 mm, and
the defocused spot 706 (compare 506) may have a diameter of 2 mm.

The two detectors (DET 1 and DET 2) may be two spaced detectors or a single laminated detector, or integrated with the focal point set in the center of the absorbing area. The planes of the two detectors are both offset from the FP, one in front of the FP and the other behind it. The offsets may be the same, or different. If the offset of one detector is different than the offset of the other detector, the detectors should be proportionally sized to account for this difference and maintain the same field of view. It is generally preferred that the two offsets are the same, and that the size of the two detectors is the same.

Each of the two detectors 702 and 704 may be a segmented multi-element detector having 4 quadrants (A, B, C, D), as discussed above. The quadrants from the first detector (DET 1) 702 may be connected in parallel to the corresponding quadrants from the second detector (DET 2) 704—$A_{DET1}$ to $A_{DET2}$, $B_{DET1}$ to $B_{DET2}$, $C_{DET1}$ to $C_{DET2}$ and $D_{DET1}$ to $D_{DET2}$—to provide an averaged response, and possibly a higher response than is available from a single detector due to a possible thicker total absorbing thickness.

Generally, the signals resulting from the on-axis example shown with a hot spot in quadrant B of DET 1 and in quadrant D of DET 2 would be for quadrants A, $A_{DET1}+A_{DET2}$
for quadrants B, $B_{DET1}+HOT+B_{DET2}$
for quadrants C, $C_{DET1}+C_{DET2}$
for quadrants D, $D_{DET1}+D_{DET2}+HOT$ and this will provide a substantial degree of "canceling out" of the hot spot (HOT) by creating cancelling "HOT" signals in opposite quadrants B and D.

The absorption of each of the two detectors may be equal ("50-50"), as mentioned above. (In other words, each of the two detectors will collect and detect a substantially equal portion of the received light able to be responded to. The detectors may not be 100% efficient); and if they are not equal (one absorbs more than the other), the signal may be adjusted accordingly using separate amplifiers with different responses, then summing the outputs to arrive at the desired averaged response.

FIG. 7C illustrates an alternate embodiment, also using two detectors (DET 1 and DET 2), and does not rely on (or utilize) the transparency of the first detector. Rather, a beam splitter (or partial reflector) may be used.

The first detector (DET 1) 702 may be disposed in front of the focal plane. A beam splitter 712 may be disposed between the lens 710 and the first detector (DET 1) 702. The second detector (DET 2) 704 may be disposed off-axis to receive light reflected by the beam splitter 712. Both detectors are aligned in rotation and with the crosshairs null on the major axis and have the same field of view.

The beam splitter 712 may cause the received light to impinge on both of the two detectors (DET 1 and DET 2), and the quadrants may be arranged as shown in FIG. 7B so that a hot spot (HOT) in quadrant B of the first detector (DET 1) 702 will manifest itself in quadrant D of the second detector (DET 2) 704. The light may impinge substantially equally ("50-50") on the two detectors.

As in the previous embodiment (FIG. 7A), in this embodiment (FIG. 7C) the first detector (DET 1) 702 may be set in front of the focal plane, and the second detector (DET 2) 704) may be is set behind the focal plane so that the beam spot image is reversed (flipped). A hot spot in the top right quadrant (B) of the first detector (DET 1) will manifest itself in the bottom left quadrant (D) of the second detector (DET 2). As in the previous example, adding the signals from the two detectors will provide a substantial degree of "canceling out" of the hot spot (HOT).

As in the previous embodiment (FIG. 7A), in this embodiment (FIG. 7C) the spot direction moves similarly in both detectors with target angle changes, but irregularities of energy across the spot may be cancelled out by the aforementioned summing of matching (corresponding) quadrants. For example, if a hot spot (HOT) at the lens extremity increased the signal in the direction of B quadrant on DET 1 before the focal plane, then the signal in the diagonally-opposite D quadrant would similarly be increased in DET 2 after the focal plane. When the B's and D's are summed, then both B sum and D sum are increased by a similar amount and the spot energy centroid remains unchanged. In this way hot spots in the beam, or lens vignetting caused by dirt has minimally affected the measured angle to the target, especially in the null position.

As in the previous embodiment (FIG. 7A), in this embodiment (FIG. 7C) when the target moves to cause the spot to travel in the direction of the B quadrant, the full spot and the hot spots move as a group to B quadrant in both DET 1 and DET 2, thus giving off null information correctly.

An advantage of this embodiment (FIG. 7C) which is different than the previous embodiment (FIG. 7A) is that two standard detectors may be used, and the transparency of the detectors is not an issue.

For wavelengths where full absorption occurs at the surface of the detector, or to use two standard detectors, a 50% reflector or beam splitter in the optical system may be used to share the energy with a second similar detector.

As a general proposition, it may not be advantageous to use the composite spot technique described above (FIG. 6) with the FIG. 7 embodiments of using two detectors, since the black spot (focused portion of the composite spot) would be defocused.

Co-Locating

There will now be described another embodiment of the invention using the large spot (including composite spot) techniques described hereinabove.

Generally, the tracker (or SPOTTR) will be used by an entity (JTAC) separate from the designator (LDO). However, it may be valuable to be able to confirm the alignment of a co-located designator (JTAC=LDO) by firing the designator at a target and verifying the azimuth and elevation measurements to that target. If the laser is aligned, then the tracker should indicate a boresight null position with equal signals in each quadrant, such as shown in FIG. 6A. The spot size and composite shape may be optimally adjusted to match the range of angular measurement required to obtain the best resolution. If the laser and tracker are misaligned, then the amount of error derived by the DSP from the quadrant signal values may be displayed for adjustment or correction purposes. See, for example, FIG. 6C and FIG. 6E.

It may also be noted that if a co-located laser is used, then the time of firing, $T_0$, will be known, and the time of signal return can be measured using a counter within the DSP to give range to the target by measuring the time delay between $T_0$ and the return echo pulse, and knowing the speed of light. The tracker (in SPOTTR) can be "range-gated" by electronically inhibiting or disregarding returns for a period of time after the laser firing, to exclude errors from strong short-range backscatter due to smoke, mist etc. It is also possible to use an optical $T_0$ pulse picked up by the detector to provide the range gate timing start.

FIG. 8 shows a tracker 810 (compare SPOTTR 210) comprising the aforementioned range-gating 812 linked to an LDO 820 (compare 110). They are electrically or optically linked for a trigger. A target 806 (compare 106) is shown. The tracker and designator are "co-located".

Alignment information of the co-located laser designator may be provided by tracking its code and comparing and measuring return angles of laser light from a target to the null boresight.

Tracking may be combined with range finding to save complexity, using the co-located designator and the time of return as measured by the tracker DSP with an electrical or optical time zero reference provided from the designator to the tracker.

The tracker can be "range-gated" by electronically inhibiting or disregarding returns for a period of time after the laser firing, to exclude errors from strong short-range backscatter due to smoke, mist etc.

The co-located designator laser pulse time may be used to inhibit the tracker receiver for a period of time, typically microseconds from the time zero reference, to allow only long-range targets to be viewed.

The invention has been illustrated and described in a manner that should be considered as exemplary rather than restrictive in character—it being understood that only preferred embodiments have been shown and described, and that all changes and modifications that come within the spirit of the invention are desired to be protected. Undoubtedly, many other "variations" on the techniques set forth hereinabove will occur to one having ordinary skill in the art to which the present invention most nearly pertains, and such variations are intended to be within the scope of the invention, as disclosed herein.

What is claimed is:

1. Method of locating at least one object being illuminated by a laser designator comprising:
   providing a tracker having a quadrant detector in a field of view;
   receiving laser light scattered by the at least one object being illuminated;
   causing the received laser light to impinge as a corresponding at least one spot on the quadrant detector;
   for each of the spots of received laser light impinging on the detector, determining an angle of the spot of the received laser light relative to a center of the field of view; and
   increasing a spot size for a defocused portion of the received laser light, a remaining focused portion of the received laser light impinging as a relatively small spot on the detector.

2. The method of claim 1, further comprising:
   increasing a size of selected ones of the multiple spots at the detector so that a given spot covers approximately one-third of the field of view.

3. The method of claim 2, further comprising:
   using the increased-in-size spots to derive off null positions of objects being illuminated.

4. The method of claim 1, further comprising:
   simultaneously processing multiple targets having been illuminated with different PRF codes.

5. The method of claim 1, further comprising
   displaying an angle with respect to null for each of the spots of received laser light.

6. The method of claim 1, wherein sizes of the spots are increased to be sufficiently large to impinge on multiple quadrants of the detector, and further comprising:
   determining centroids for the spots: and
   providing outputs representing elevation and azimuth of the centroids of the spots relative to a boresight direction.

7. The method of claim 6, further comprising:
   providing the outputs representing elevation and azimuth for each of multiple objects being illuminated, each tagged with a code to allow for identification of their respective designators.

8. The method of claim 1, further comprising:
   calculating azimuth and elevation angular co-ordinates for centroids of the spots by measuring energy of the received laser light in each quadrant of the detector.

9. The method of claim 1, further comprising:
increasing a size of the at least one spots at the detector so that a given spot covers approximately one-third of the field of view.

10. The method of claim 9, further comprising:
using the increased-in-size spots to derive off null positions of objects being illuminated.

11. The method of claim 1, further comprising:
simultaneously processing multiple targets having been illuminated with different PRF codes.

12. The method of claim 1, further comprising
displaying an angle with respect to null for each of the spots of received laser light.

13. The method of claim 1, wherein sizes of the spots are increased to be sufficiently large to impinge on multiple quadrants of the detector, and further comprising:
determining centroids for the spots: and
providing outputs representing elevation and azimuth of the centroids of the spots relative to a boresight direction.

14. The method of claim 13, further comprising:
providing the outputs representing elevation and azimuth for each of multiple objects being illuminated, each tagged with a code to allow for identification of their respective designators.

15. The method of claim 1, further comprising:
calculating azimuth and elevation angular co-ordinates for centroids of the spots by measuring energy of the received laser light in each quadrant of the detector.

16. The method of claim 1, wherein the quadrant detector comprises two quadrant detectors, and further comprising:
disposing a first of the two detectors effectively in front of a focal plane;
disposing a second of the two detectors effectively behind the focal plane; and
combining outputs of the two detectors to reduce inconsistencies of amplitude within the spots.

17. Method of locating at least one object being illuminated by a laser designator comprising:
providing a tracker having a quadrant detector in a field of view;
receiving laser light scattered by the at least one object being illuminated;
causing the received laser light to impinge as a corresponding at least one spot on the quadrant detector;
for each of the spots of received laser light impinging on the detector, determining an angle of the spot of the received laser light relative to a center of the field of view;
calculating azimuth and elevation angular co-ordinates for centroids of the spots by measuring energy of the received laser light in each quadrant of the detector; and
adding signals from the quadrants on each side of an axis of interest, and deriving a ratio of these quadrants such that that the ratio varies as the spot traverses the quadrants across the axis of interest.

18. The method of claim 17, further comprising:
adding signals from the quadrants on opposite sides of an axis of interest, and deriving a ratio of these quadrants such that that the ratio varies as the spot traverses the quadrants across the axis of interest.

19. Method of locating multiple objects being illuminated by at least one laser designator comprising:
providing a tracker having a quadrant detector in a field of view;
receiving laser light scattered by the multiple objects being illuminated;
causing the received laser light to impinge as corresponding multiple spots on the quadrant detector;
for each of the spots of received laser light impinging on the detector, determining an angle of the spot of the received laser light relative to a center of the field of view; and
wherein the quadrant detector comprises two quadrant detectors, and further comprising:
disposing a first of the two detectors effectively in front of a focal plane;
disposing a second of the two detectors effectively behind the focal plane; and
combining outputs of the two detectors to reduce inconsistencies of amplitude within the spots.

\* \* \* \* \*